(12) United States Patent
Kent et al.

(10) Patent No.: US 11,952,767 B2
(45) Date of Patent: *Apr. 9, 2024

(54) UNDERGROUND STORAGE SYSTEM WITH V SHAPED SUPPORT LEGS

(71) Applicant: Bio Clean Environmental Services, Inc., Oceanside, CA (US)

(72) Inventors: Zachariha J. Kent, San Antonio, TX (US); Corey Haeder, Maple Grove, MN (US); John Scott, Fallbrook, CA (US)

(73) Assignee: BIO CLEAN ENVIRONMENTAL SERVICES, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,528

(22) Filed: Jan. 11, 2022

(65) Prior Publication Data
US 2022/0127834 A1    Apr. 28, 2022

Related U.S. Application Data

(63) Continuation of application No. 16/577,617, filed on Sep. 20, 2019, now Pat. No. 11,220,815, which is a
(Continued)

(51) Int. Cl.
*E03F 1/00* (2006.01)
*B65G 5/00* (2006.01)
(Continued)

(52) U.S. Cl.
CPC ............... *E03F 1/005* (2013.01); *B65G 5/00* (2013.01); *E03B 11/14* (2013.01); *E03F 1/002* (2013.01);
(Continued)

(58) Field of Classification Search
CPC ........... E03F 1/002; E03F 1/003; E03F 1/005; E02B 11/00; B65G 5/00
See application file for complete search history.

(56) References Cited

U.S. PATENT DOCUMENTS

D201,340 S * 6/1965 Klng ........................ F17C 3/005
                                                        D25/56
D236,673 S * 9/1975 Ehrman .................... B65G 5/00
                                                        D6/695.2
(Continued)

FOREIGN PATENT DOCUMENTS

CA    2462101    2/1949
DE    4400183    7/1995
(Continued)

OTHER PUBLICATIONS

Almanstoetter Juergen Dipl Phy, "Hexagonal drainage elements assembled as drainage lining for open refuse tip", Notification date Feb. 7, 2018, Translation DE4400183 (Original Doc. published Jul. 6, 1995), 6 pages.
(Continued)

*Primary Examiner* — Frederick L Lagman
(74) *Attorney, Agent, or Firm* — THOMPSON HINE LLP

(57) ABSTRACT

Individual four-sided shaped modules used in an assembly for underground storage of storm water and other fluid storage needs. Modules are assembled into a resultant four-sided tiling shape for maximized structural strength and material use efficiency. Internal four-sided shaped modules are assembled and encased by external four-sided shaped modules. Internal adjacent modules are in direct fluid communications with one another through a channel-less chamber. Internal four-sided shaped modules drain into four-sided shaped modules chamber where fluid is either stored or
(Continued)

drained. Assemblies include various top and side pieces along with access ports for entry into said assembly.

43 Claims, 27 Drawing Sheets

Related U.S. Application Data continuation of application No. 16/537,585, filed on Aug. 11, 2019, now Pat. No. 11,149,427, which is a continuation of application No. 16/214,464, filed on Dec. 10, 2018, now abandoned, which is a continuation of application No. 15/782,961, filed on Oct. 13, 2017, now Pat. No. 10,151,096, which is a continuation-in-part of application No. 15/657,253, filed on Jul. 24, 2017, now Pat. No. 10,151,083.

(60) Provisional application No. 62/394,118, filed on Sep. 13, 2016.

(51) Int. Cl.
| | |
|---|---|
| *E03B 11/14* | (2006.01) |
| *F17C 3/00* | (2006.01) |
| *E02B 11/00* | (2006.01) |
| *E03B 3/03* | (2006.01) |
| *E21D 13/00* | (2006.01) |

(52) U.S. Cl.
CPC ............ *F17C 3/005* (2013.01); *E02B 11/005* (2013.01); *E03B 3/03* (2013.01); *E21D 13/00* (2013.01); *F17C 2203/0612* (2013.01)

(56) References Cited

U.S. PATENT DOCUMENTS

| | | | | | |
|---|---|---|---|---|---|
| 4,239,416 | A * | 12/1980 | Borca | ................ | E21F 17/16 220/62.21 |
| 4,363,563 | A * | 12/1982 | Hallenius | ................ | B65G 5/00 405/53 |
| 4,708,523 | A * | 11/1987 | Sagefors | ................ | E21D 13/00 405/53 |
| 5,017,042 | A * | 5/1991 | Minor | ................ | E02D 31/02 405/36 |
| 5,387,741 | A * | 2/1995 | Shuttle | ................ | B09B 1/008 588/259 |
| 5,542,780 | A * | 8/1996 | Kourgli | ................ | E02D 29/12 405/53 |
| 5,810,510 | A * | 9/1998 | Urriola | ................ | E03F 1/005 210/170.03 |
| 5,848,856 | A * | 12/1998 | Bohnhoff | ................ | E02B 11/00 405/36 |
| 6,095,718 | A * | 8/2000 | Bohnhoff | ................ | E03F 1/005 405/36 |
| 6,419,421 | B1 * | 7/2002 | Whitfield, Jr. | ................ | E03F 1/002 210/170.03 |
| 6,428,870 | B1 * | 8/2002 | Bohnhoff | ................ | E02B 11/00 52/180 |
| 6,514,009 | B2 * | 2/2003 | Northcott | ................ | B65D 88/78 220/23.91 |
| 6,626,609 | B1 * | 9/2003 | Kotani | ................ | E03F 1/002 210/170.03 |
| 6,962,464 | B1 * | 11/2005 | Chen | ................ | E03B 3/03 405/36 |
| 6,991,402 | B2 * | 1/2006 | Burkhart | ................ | E03F 5/101 405/36 |
| 7,080,480 | B2 * | 7/2006 | Urban | ................ | E03F 1/005 210/170.03 |
| 7,160,058 | B2 * | 1/2007 | Burkhart | ................ | E03F 5/106 405/36 |
| 7,344,335 | B2 * | 3/2008 | Burkhart | ................ | E03F 1/005 405/36 |
| 7,591,610 | B2 * | 9/2009 | Krichten | ................ | E03F 1/005 405/53 |
| 7,621,695 | B2 * | 11/2009 | Smith | ................ | E03F 1/005 210/170.03 |
| D617,867 | S * | 6/2010 | May | ................ | D23/206 |
| D635,639 | S * | 4/2011 | Dzwonczyk | ................ | D23/206 |
| D651,278 | S * | 12/2011 | Graves | ................ | D23/202 |
| D654,556 | S * | 2/2012 | McIntosh | ................ | D23/202 |
| 8,162,567 | B2 * | 4/2012 | Obermeyer | ................ | E03F 1/002 405/53 |
| 8,256,991 | B2 * | 9/2012 | Dickinson, III | ........ | E21B 33/138 405/53 |
| 8,360,100 | B2 * | 1/2013 | Burkhart, Sr. | .......... | E03F 1/003 210/170.03 |
| 8,590,564 | B2 * | 11/2013 | Burkhart, Sr. | .......... | E03F 5/101 210/170.03 |
| 8,770,890 | B2 * | 7/2014 | May | ................ | E03F 5/101 405/51 |
| 9,428,880 | B2 * | 8/2016 | May | ................ | E03F 1/002 |
| D767,924 | S * | 10/2016 | Livingston | ................ | D6/691 |
| 9,580,899 | B2 * | 2/2017 | Rotondo | ................ | B65G 5/00 |
| D786,510 | S * | 5/2017 | Murljacic | ................ | D6/675 |
| D795,384 | S * | 8/2017 | Kent | ................ | D23/206 |
| D795,385 | S * | 8/2017 | Kent | ................ | D6/695 |
| 9,732,508 | B1 * | 8/2017 | Kent | ................ | E03F 1/005 |
| D810,857 | S * | 2/2018 | Zarraonandia | ................ | D23/206 |
| D810,858 | S * | 2/2018 | Zarraonandia | ................ | D23/206 |
| 9,951,508 | B2 * | 4/2018 | May | ................ | E01F 5/00 |
| 10,151,083 | B2 * | 12/2018 | Kent | ................ | B65G 5/00 |
| 10,151,096 | B2 * | 12/2018 | Kent | ................ | F17C 3/005 |
| 10,267,028 | B2 * | 4/2019 | May | ................ | E03F 5/101 |
| 10,267,029 | B2 * | 4/2019 | Kent | ................ | E03F 1/002 |
| 10,626,580 | B2 * | 4/2020 | Kent | ................ | F17C 3/005 |
| 10,774,516 | B2 | 9/2020 | Kent et al. | | |
| 11,149,427 | B2 | 10/2021 | Kent et al. | | |
| 11,220,815 | B2 * | 1/2022 | Kent | ................ | E03F 1/002 |
| D955,064 | S * | 6/2022 | Wang | ................ | D30/118 |
| 2004/0076473 | A1 * | 4/2004 | Burkhart | ................ | E03F 5/106 405/39 |
| 2007/0053746 | A1 * | 3/2007 | Dickie | ................ | E03F 1/003 405/48 |
| 2007/0181197 | A1 * | 8/2007 | Krichten | ................ | E03F 1/005 137/833 |
| 2007/0217866 | A1 * | 9/2007 | Oscar | ................ | E03F 1/005 405/36 |
| 2008/0166182 | A1 * | 7/2008 | Smith | ................ | E03F 1/005 405/36 |
| 2009/0049760 | A1 * | 2/2009 | Stuck | ................ | B65D 90/027 52/169.6 |
| 2009/0279953 | A1 * | 11/2009 | Allard | ................ | E03F 1/005 405/39 |
| 2010/0021236 | A1 * | 1/2010 | Kreikemeier | ................ | E03F 1/005 405/55 |
| 2011/0253238 | A1 * | 10/2011 | Burkhart, Sr. | .......... | E03F 1/005 137/580 |
| 2012/0201603 | A1 | 8/2012 | Boulton et al. | | |
| 2014/0105684 | A1 * | 4/2014 | Allard | ................ | E02B 11/00 405/52 |
| 2014/0291221 | A1 * | 10/2014 | Adams | ................ | E03F 3/046 210/170.03 |
| 2016/0097175 | A1 * | 4/2016 | Parker | ................ | E03F 1/005 405/184.4 |
| 2016/0265209 | A1 * | 9/2016 | Graf | ................ | E03F 1/005 |
| 2016/0333566 | A1 * | 11/2016 | Zarraonandia | .......... | E03F 1/005 |
| 2017/0321397 | A1 * | 11/2017 | Kent | ................ | E03B 11/14 |
| 2017/0328052 | A1 * | 11/2017 | Kent | ................ | E03F 1/002 |
| 2018/0030712 | A1 * | 2/2018 | Kent | ................ | E03F 1/005 |

FOREIGN PATENT DOCUMENTS

| | | | | |
|---|---|---|---|---|
| EP | 1932975 A1 * | 6/2008 | ............ | E03F 1/005 |
| FR | 2927913 A1 | 8/2009 | | |
| GB | 2417733 | 3/2006 | | |
| JP | S60-92527 | 5/1985 | | |
| JP | H5-280085 | 10/1993 | | |
| JP | H6-26091 | 2/1994 | | |
| JP | H7-2475593 A | 9/1995 | | |

(56) References Cited

FOREIGN PATENT DOCUMENTS

| JP | 20011931139 A | 6/2009 |
|---|---|---|
| WO | 8403658 | 9/1984 |
| WO | 2013159737 | 10/2013 |

OTHER PUBLICATIONS

Beijing Rechsand Sci & Tech Gr [CN] + (Beijing Rec Rechsand Science & Technology Group Co., Ltd), "Water purification and storage system, water-filtering well and polygonal building block", Notification date Jan. 14, 2020, Translation WO2013159737 A1 (Original Doc. published Oct. 31, 2013).

Suzuki, Michiko, "Water Storage Device for River Utilization", Translation S60-92527 (Original Doc. published May 24, 1985), 8 pages.

Nitto Co., Ltd., "Retarding Basin Device", Translation H5-280085 (Original Doc. published Oct. 26, 1993), 13 pages.

Haneda Concrete Industry Co., Ltd., "Underground Structure for Rainwater Storage Infiltration", Translation H6-26091 (Original Doc. published Feb. 1, 1994), 14 pages.

Haneda Concrete Industry Co., Ltd., "Rainwater Storage and Infiltration Facility", Translation 07-166595 (Original Doc. published Jun. 27, 1995), 11 pages.

Asahi Concrete Works, Co, Ltd. "Rainwater Storage Tank", Translation H7-2475593 (Original Doc. published Sep. 26, 1995), 18 pages.

Ishikawajima Kenzai Kogyo KK, "Multiple Box Culvert and its Assembling Method", Translation 20011931139 (Original Doc. published Jun. 3, 2009), 7 pages.

Prefac Beton Environment SA, et al., "Prefabricated concrete element for forming rain water recovery reservoir in e.g. parking lot, has recess defining discharge channel for discharging rain water from upper face of plate towards lower face of plate facing side of feet", Translation 2927913 (Original Doc. published Aug. 28, 2009), 11 pages.

* cited by examiner

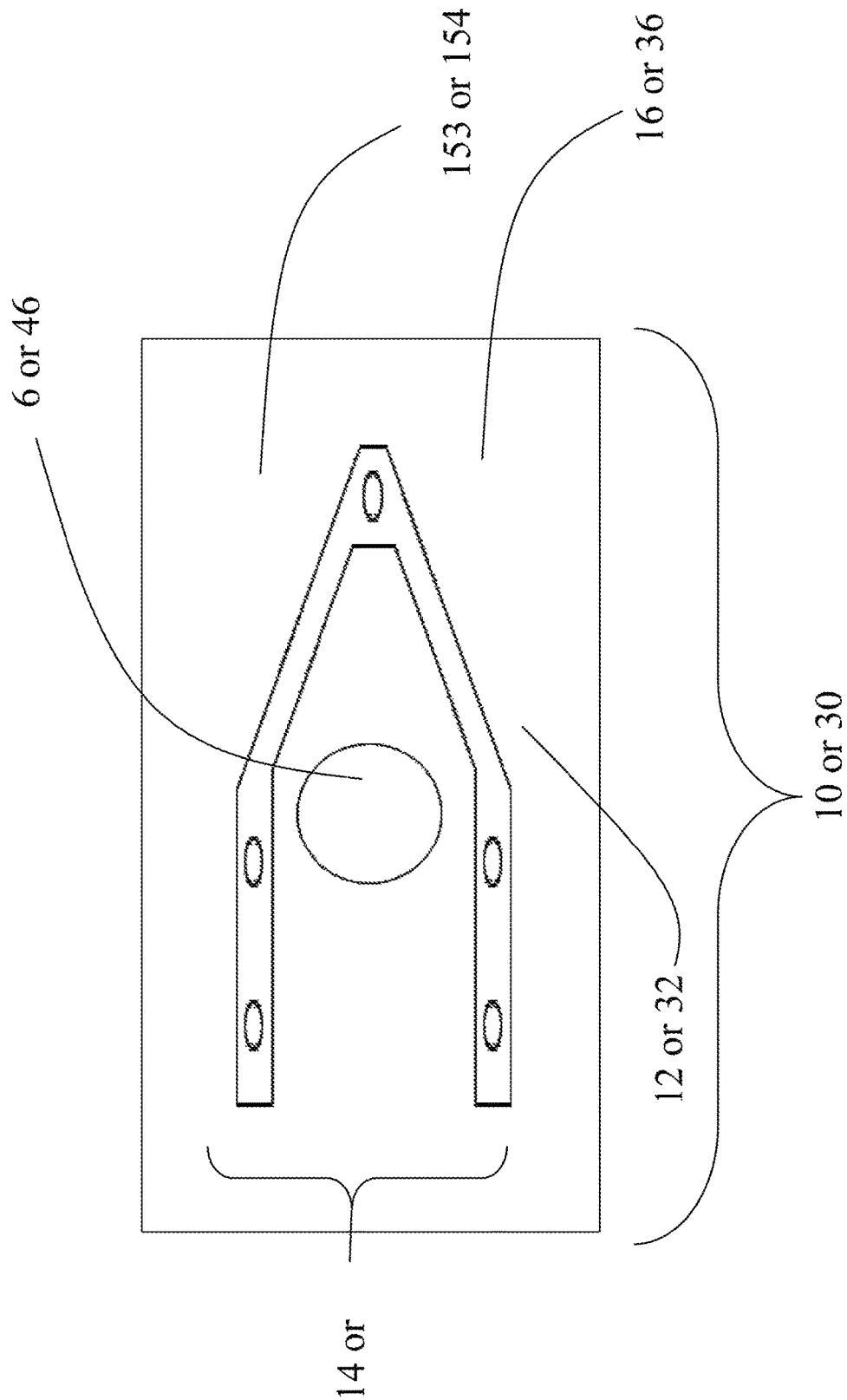

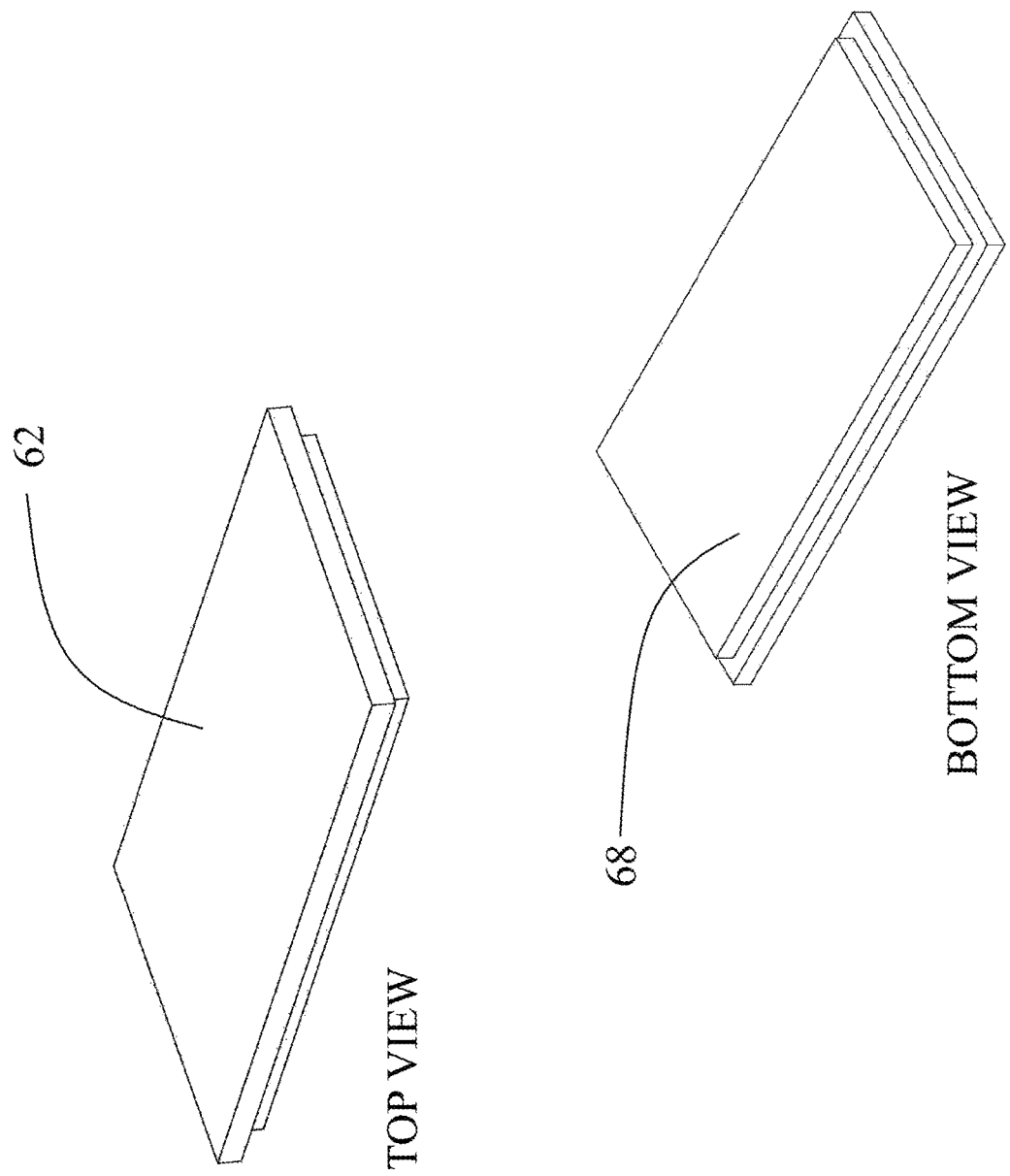

UNDERGROUND STORAGE SYSTEM WITH V SHAPED SUPPORT LEGS

CROSS-REFERENCE TO RELATED APPLICATION(S)

The present application is a Continuation of U.S. patent application Ser. No. 16/577,617 filed Sep. 20, 2019, now U.S. Pat. No. 11,220,815, issued on Jan. 11, 2022, which was a Continuation of U.S. patent application Ser. No. 16/214,464 filed Dec. 10, 2018, which is now abandoned and which was which a Continuation of U.S. patent application Ser. No. 15/782,961 filed Oct. 13, 2017, now U.S. Pat. No. 10,151,096, issued on Dec. 11, 2018, which is a Continuation-in-Part of U.S. patent application Ser. No. 15/657,253, filed on Jul. 24, 2017, now U.S. Pat. No. 10,151,083, issued on Dec. 11, 2018, which is a non-provisional of U.S. Provisional Patent Application No. 62/394,118 filed on Sep. 13, 2016 and a Continuation-in-Part of U.S. patent application Ser. No. 15/135,514, filed on Apr. 21, 2016, now U.S. Pat. No. 9,732,508, issued on Aug. 15, 2017. The present application is also a Continuation-in-Part of U.S. Design patent application No. 29/611,522, filed Jul. 21, 2017, now U.S. Design patent No. D828,902, issued on Sep. 18, 2019; and U.S. Design patent application No. 29/611,524, filed Jul. 21, 2017, now U.S. Design patent No. D828,903, issued on Sep. 18, 2019. Additionally, the subject matter of the present application is related to the following patent applications: U.S. Design patent application No. 29/567,711 filed on Jun. 10, 2016; now patent number D795,383, issued on Aug. 22, 2017 and U.S. Design patent application No. 29/571,016, filed on Jul. 13, 2017, now patent number D795,385. The above-referenced applications, including the drawings, are specifically incorporated by reference herein in their entirety for all that they disclose and teach and for all purposes.

FIELD OF THE INVENTION

The embodiments of the present technology relate, in general, to the capture, storage, infiltration, and filtration of fluids, system and methods of using the same, including the subterranean water capture, storage, infiltration and filtration, system and methods of using the same. Although the present invention is described in context of stormwater storage and filtration, the invention is not so limited.

BACKGROUND

Fluid storage systems have been in existence for many years, specifically underground storage systems for the collection and storage of water. While water is collected underground for various reasons, over the past 20 years there has been increased focus on collecting and storing storm water runoff. This is done because of two main concerns. The quantity of storm water runoff is a concern because larger volumes of associated runoff can cause erosion and flooding. Quality of storm water runoff is a concern because storm water runoff flows into our rivers, streams, lakes, wetlands, and/or oceans. Larger volumes of polluted storm water runoff flowing into such bodies of water can have significant adverse effects on the health of ecosystems.

The Clean Water Act of 1972 enacted laws to improve water infrastructure and quality. Storm water runoff is the major contributor to non-point source pollution. Studies have revealed that contaminated storm water runoff is the leading cause of pollution to our waterways. As we build houses, buildings, parking lots, roads, and other impervious surfaces, we increase the amount of water that runs into our storm water drainage systems and eventually flows into rivers, lakes, streams, wetlands, and/or oceans. As more land becomes impervious, less rain seeps into the ground, resulting in less groundwater recharge and higher velocity surface flows, which cause erosion and increased pollution levels in water bodies and the environment.

To combat these storm water challenges associated with urbanization storm water detention, infiltration and retention methods have been developed to help mitigate the impact of increased runoff. Historically, open detention basins, wetlands, ponds or other open systems have been employed to capture storm water runoff with the intention of detaining and slowly releasing downstream over time at low flows using outlet flow controls, storing and slowly infiltrating back into the soils below to maximize groundwater recharge or retain and use for irrigation or other recycled water needs. While the open systems are very effective and efficient, the cost of the land associated with these systems can make them prohibitive. In areas such as cities or more densely populated suburbs the cost of land or availability of space has become limited. In these areas many developers and municipalities have turned to the use of underground storage systems which allow roads, parking lots, and building to be placed over the top of them.

A wide range of underground storage systems exist, specifically for the storage of storm water runoff. Arrays of pipes, placed side-by-side are used to store water. Pipe systems made of concrete, plastic or corrugated steel have been used. More recently arched plastic chamber systems have been in use. As with pipes, rock backfill is used to fill the space surrounding them to create added void areas for storing additional water along with providing additional structural reinforcement.

In general, these types of systems require at least one foot of rock backfill over the top and at least one or more feet of additional native soil over the top to support the loading associated with vehicles on streets and parking lots. These systems also require rock backfill of a foot or more around their perimeter sides to provide structural reinforcement due to lateral loading associated with soil pressure.

Lastly, these systems must also be placed on a rock base for structural support. Because these systems are rounded or arched, a substantial amount of rock backfill must be used to surround them and placed in between the systems. As such, the amount of void space available for storing water compared to the amount of soil required to be excavated is only around 60 percent.

Over time, plastic and concrete rectangular or cube shaped modular systems were developed that more efficiently stored storm water because the modules could be placed side-to-side and end-to-end without the need for additional rock backfill to be placed between each module as found with pipe and arched systems. With these rectangular and cube shaped systems the void space available for storing water compared to the amount of soil required to be excavated is up to 90% or more. While plastic type rectangular and cubed systems still require at least two feet of rock backfill over the top, two feet around the perimeter sides, and six inches underneath to handle downward and lateral loading, the concrete rectangular and cubed systems do not.

Concrete rectangular or cubed modular systems have the benefit of not requiring rock backfill over the top or surrounding the sides because of their additional strength when compared to plastic systems. For example, currently available concrete systems can have the bottom of the structure as deep as eighteen feet below surface level standard wall thickness. The thickness of the structure can increase from six inches to eight inches or more plus adding additional rebar reinforcement to allow for deeper installation.

Most concrete rectangular or cube shaped structures have five sides, four vertically extending walls and a bottom or top side. One side must be open because of how pre-cast concrete molds are made and how the concrete structure is pulled from the mold. At least one side of the concrete structure must be missing for it to be pulled from the metal mold that consists of inner and outer walls and either a top or bottom side.

Unfortunately, this missing side which is required for manufacturing, creates an inherent weak point for the walls. The middle of each wall, especially the longer walls for rectangular structures, where the wall meets the end of the missing top or bottom side has no perpendicular connection as with the opposite side of the same wall where it connects to the top or bottom side. This weak point on the center of each wall at the open end is the reason why these systems have depth limitations. This is known as deflection. This weak point becomes further exaggerated the taller the wall becomes and the longer it becomes; the further away it is from the perpendicular connecting floor or adjacent wall on the opposite end. Therefore, taller systems which extend down deeper from the surface underground run into a compounding problem of taller walls and increased lateral loading (soil pressure).

Recently, an approach to the aforementioned technical problem has been to replace solid wall chambers with cantilever, or semi-arched arm braces, to support the top module. This approach falls short of addressing common problems in the industry as these systems still cannot sustain increased soil pressure and lateral loading due to its shape without need to increase the wall thickness of the modules or increase the amount of rebar reinforcing therefore increasing material and overall cost of deep installations. The present technology presents a novel approach to addressing common industry limitations.

The need for a system overcoming these inherent shape-related limitations is evident. The present invention provides an exemplary solution including the method, system, and apparatuses derived from principles of biomimetics; specifically, the employment of tessellated modular assembly. The construction of interlinking mosaic shapes and material layering increases the strength of the modular assembly by reducing crack propagation; thereby allowing the assembly to be underground at greater depths than underground water storage systems known in the art. This type of geometric arrangement also overcomes potential structural weakness of an individual module, as a result of manufacturing errors or transport mishaps. Mosaic configurations disclosed herein also mitigate swelling pressure of ambient soil due to the segmentation design. Paving roads with small segmented materials such as brick or paving stones, as an example, has long been utilized to withstand soil swelling. In addition, an innovative double V shaped mirrored cantilevered leg design provides support via several engineered improvements, including: 1) more efficiently distributes the load; 2) minimizes deflection without the need for more than two legs, and 3) allowing the legs to be fully cantilevered without the need to extend to any end/side of the top or bottom slab. This double V shaped mirrored leg design also overcomes issues with form building and production as the shape and orientation allow the form walls to easily roll away from the molded piece without the need for tapered legs which reduces production and form costs. V shape designs are found in nature, where they are recognized as being efficient and strong. An example is the cross section of blades of grass.

Design inspired by these efficient structures found in nature and the employment these more economic natural shapes, in combination with current precast concrete design processes, present a unique approach for overcoming the limitations of the previous approaches in the industry.

SUMMARY

The invention provides an exemplary method, system, and apparatuses depicted, in one of its many embodiments, as a module and an assembly of modules for collection, storage, infiltration, and treatment of liquid. In accordance with certain embodiments, an improved modular, underground module(s) design and resulting tessellated modular assemblies and related components is disclosed. The arrangement of modules creating interlinking mosaic shapes and concrete material layering creates a tessellated structure for maximized strength. Tessellation provides superior strength on all sides of each module and the assembly as a whole when compared to any rectangular or cubed shaped module known in the art. Its ability to equally distribute loads from the earth on its sides allows it to be installed deeper with reduced wall thickness and rebar reinforcing.

In accordance with preferred embodiments, an improved modular, underground module(s) design and resulting tessellated assemblies and related components with three modular configurations including internal, perimeter, and side panels for corners.

In accordance with certain embodiments, an improved modular, underground four-sided shaped module(s) design and resulting tessellated assemblies and related components for collection and storage of storm water.

In accordance with certain embodiments, an improved modular, underground four-sided shaped module(s) design and resulting tessellated assemblies and related components for infiltration of storm water by utilizing channel-less water flow patterns and a porous base or holes in the floor and/or outflow pipes.

In accordance with certain embodiments, an improved modular, underground four-sided shaped module(s) design and resulting tessellated assemblies and related components for the storage, treatment and infiltration of and other collected and stored, non-flammable fluid needs are provided.

In accordance with certain embodiments, a four-sided shaped module(s) design and resulting tessellated shaped assemblies and related components with internal four-sided modules placed within external four-sided modules; wherein the internal modules have two fully cantilevered V shaped legs that mirror one another and point toward one another, wherein the external four-sided modules have a combination of two legs that mirror each other and a wall opposite the legs.

In accordance with other embodiments, a four-sided shaped module(s) design and resulting tessellated assemblies and related components with internal four-sided modules placed within external four-sided modules; wherein the internal modules have legs and no side walls, wherein the external four-sided modules have a combination of legs and side walls.

In accordance with some embodiments, assembly can be configured into various shapes and sizes, all being of a four-sided shape, and are useful for meeting the size, space and shape restrictions of locations where the assemblies are being installed and may be arranged into four-sided, rectangles, L shapes, S shaped, U shaped and other shapes required to fit within construction site constraints.

In accordance with yet another embodiment, assembly of the modules can be of various shapes of less than or more than four sides and can also have curved sides.

It should be appreciated that embodiments of the present technology are disclosed herein, with the preferred embodiment for the management of storm water runoff underground.

Further embodiments will be apparent from this written description and accompanying figures.

BRIEF DESCRIPTION OF THE DRAWINGS

FIG. 14e illustrates an underside bottom or top view of an internal module and a single V shaped leg configuration and optional access hole, in accordance with one embodiment.

FIG. 16 illustrates a perspective view of top slabs to shown from the top and bottom sides, in accordance with one embodiment.

DETAILED DESCRIPTION

The present embodiment(s) provides a tessellated module and assembly of modules for the underground collection and storage of fluids. Tessellated modules offer enhanced strength due to the interlinking and multi-layering design. Modules can be assembled into various shapes and sizes to meet the size, space and shape restrictions of locations where the assemblies are being installed.

The present embodiment(s) is an improvement over other underground storage systems known in the art attributed to a general V shaped leg, where the intersection point of each leg faces inward, toward each other. Such legs are positioned inward from the edges of the modules. The combination of these features increases the top load balance of the underground modules while reducing the amount of materials required.

The module assembly can be generally four-sided, rectangular, L-shaped or other configurations to work around other underground structures, including but not limited to sewer lines, utilities, fuel storage tanks, water mains and others. The tessellating process and resulting mosaic and layered assembly further provides greatly improved strength at increased depths when compared to currently available technologies and thus overcomes limitations with lateral soil pressures which increase proportionately to the depth below the ground surface.

Tessellated modules and resulting mosaic and layered assemblies can be installed at various depths and at various module heights. The top of the top module can be flush with the ground surface and placed in parking lots, landscape areas, sidewalks, airports, ports and streets and can be designed to handle site specific loading conditions such as parkway, indirect traffic, direct traffic and others. The module and assembly can also be placed deeper underground with the top of the top module being from a few inches to several dozen feet below finish surface due to its high strength design. The height of the individual modules or resulting assembled two-piece module can be from a few feet to over a few dozen feet in height.

The tessellated modules and mosaic and layered assembly will allow this system, used for storage of fluids, to be installed deeper underground and be able to handle increased pressure and soil loads due to its shape without need to increase the wall thickness of the modules or increase the amount of rebar reinforcing therefore decreasing material and overall cost of deep installations. This is a major benefit over existing technologies or methods.

Figure 9:
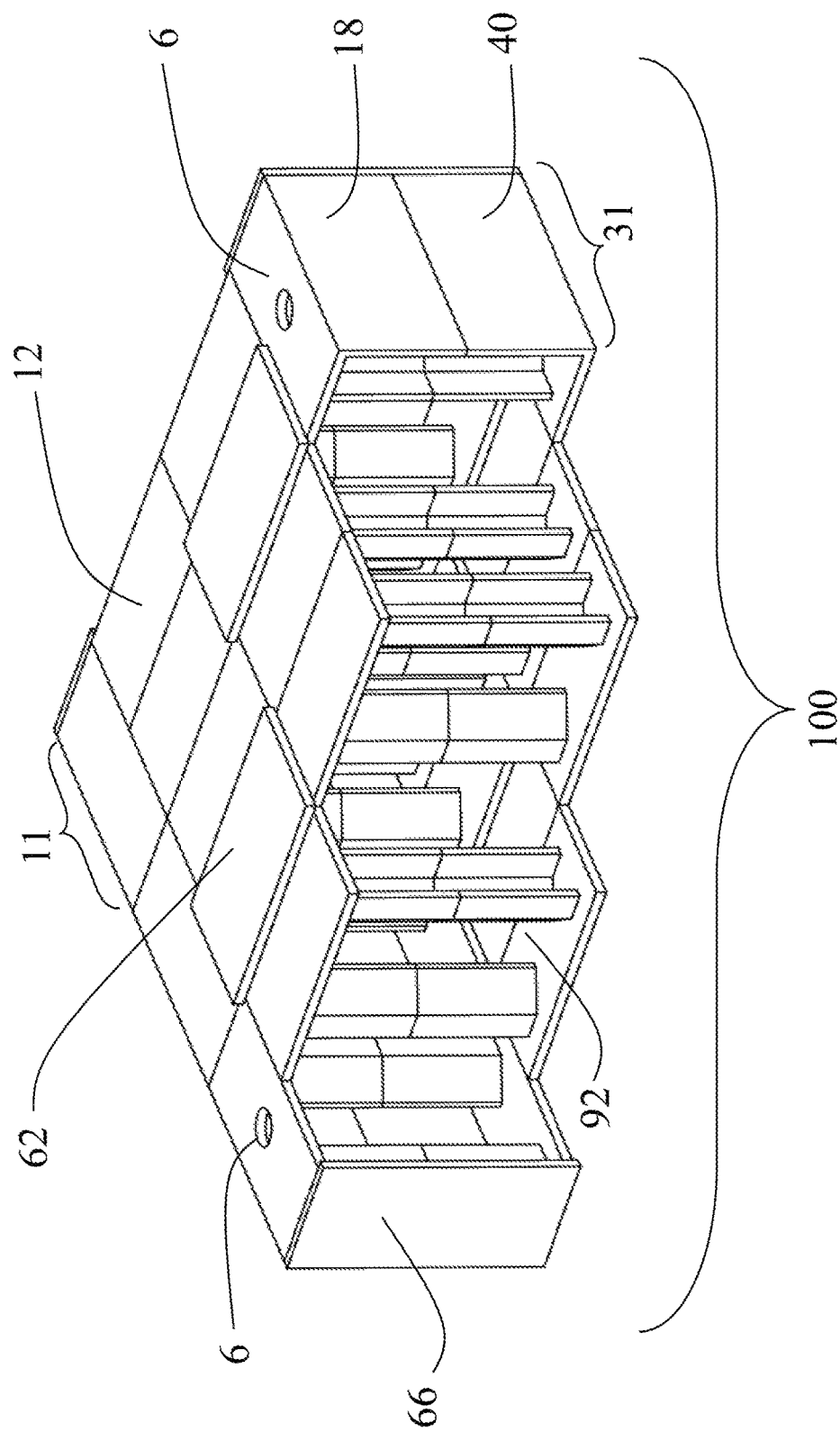
FIG. 9 illustrates a side cut-away view of the partial assembly of the top modules and bottom internal modules and top of bottom perimeter modules with built-in side walls 18 and side panels 66 only at the corners, in accordance with one embodiment.

In certain embodiments of the present technology, the absence of internal walls in the design of the internal module and the way modules join together with up to one module being in direct fluid communication with three other modules promotes unrestricted water flow between modules in all directions 92 (as presented in FIG. 9). This results in a more hydraulically efficient system and allows for fluid to evenly disburse through the assembly and minimize drag, velocities within the system, head loss and in turn enhance the system's ability to capture pollutants contained within the incoming storm water runoff, especially pollutants such as trash, sediment and TSS which are more easily removed when velocities are reduced via settling.

Figure 2:
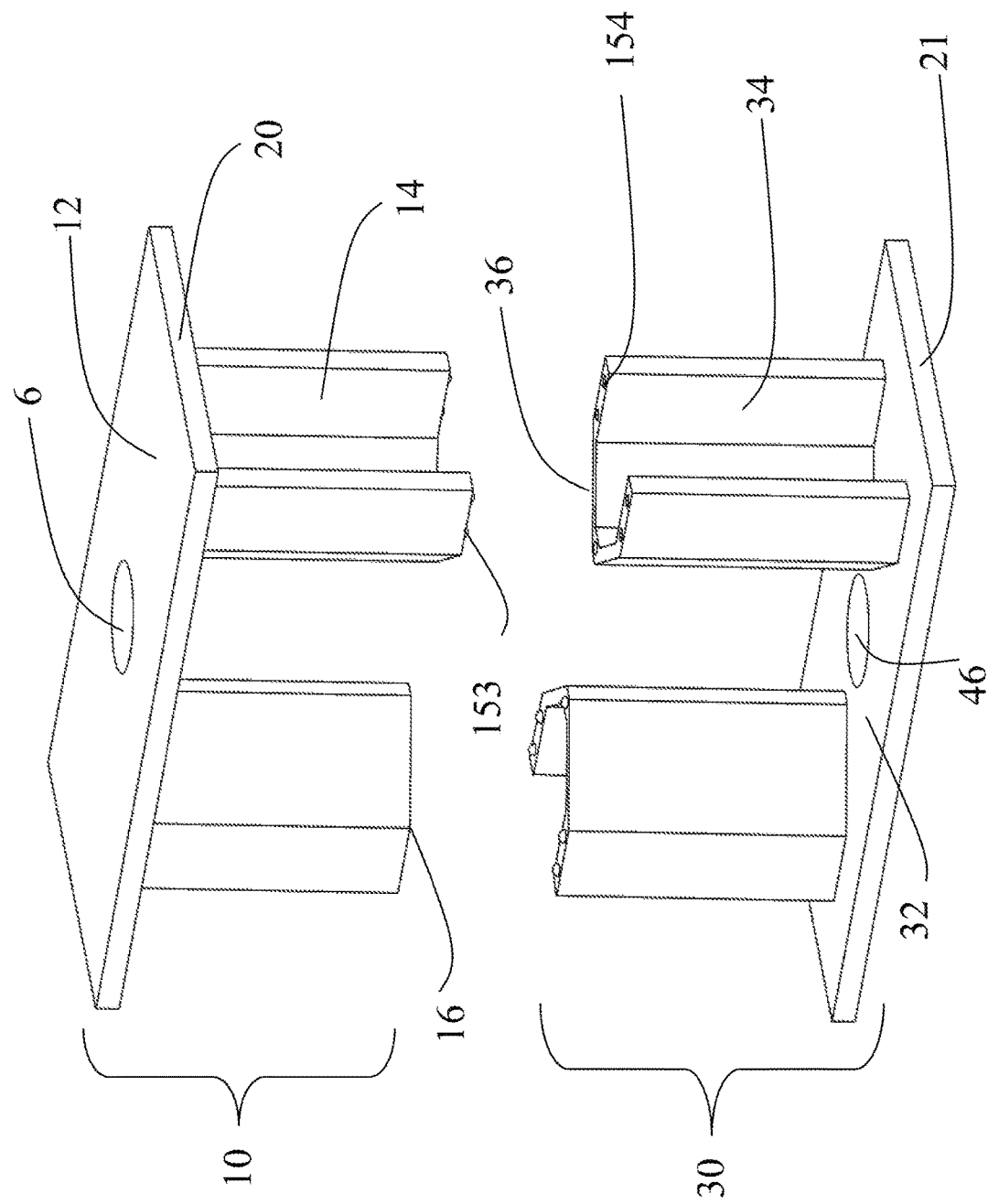
FIG. 2 illustrates a perspective view of an internal top module with two, inset v-shaped legs stacked with an internal bottom module with two, inset v-shaped legs, in accordance with one embodiment.

In another embodiment, drainage holes at the bottom of a module allow storm water to fully drain out to the floor preventing standing water. FIG. 2 illustrates one embodiment of a single drain hole 46; however, a module may contain zero to many drainage holes 46 located within the bottom module floor 32 when infiltration of water back into the native soil below the complete storage assembly system 100 is desired. These drainage holes allow water to exit the system evenly throughout every bottom module. A complete storage assembly system 100 includes both inflow pipes 80 and outflow pipes 82 as in FIG. 18 through any of the module side walls 18, 40 and side panels 66.

In accordance with certain embodiments, modifications of side panels 66 in specific chambers can also be made near inflow points to act as pre-treatment settling chambers and isolate incoming sediments and other pollutants. Said side panels 66 may be affixed to the sidewalls of top and/or bottom modules 18 and 40.

In some embodiments, specific chambers near outlet points can be modified to include treatment devices or methods such as media filters, membrane filters, biofilters to further treat storm water runoff before leaving the system.

Figure 21:
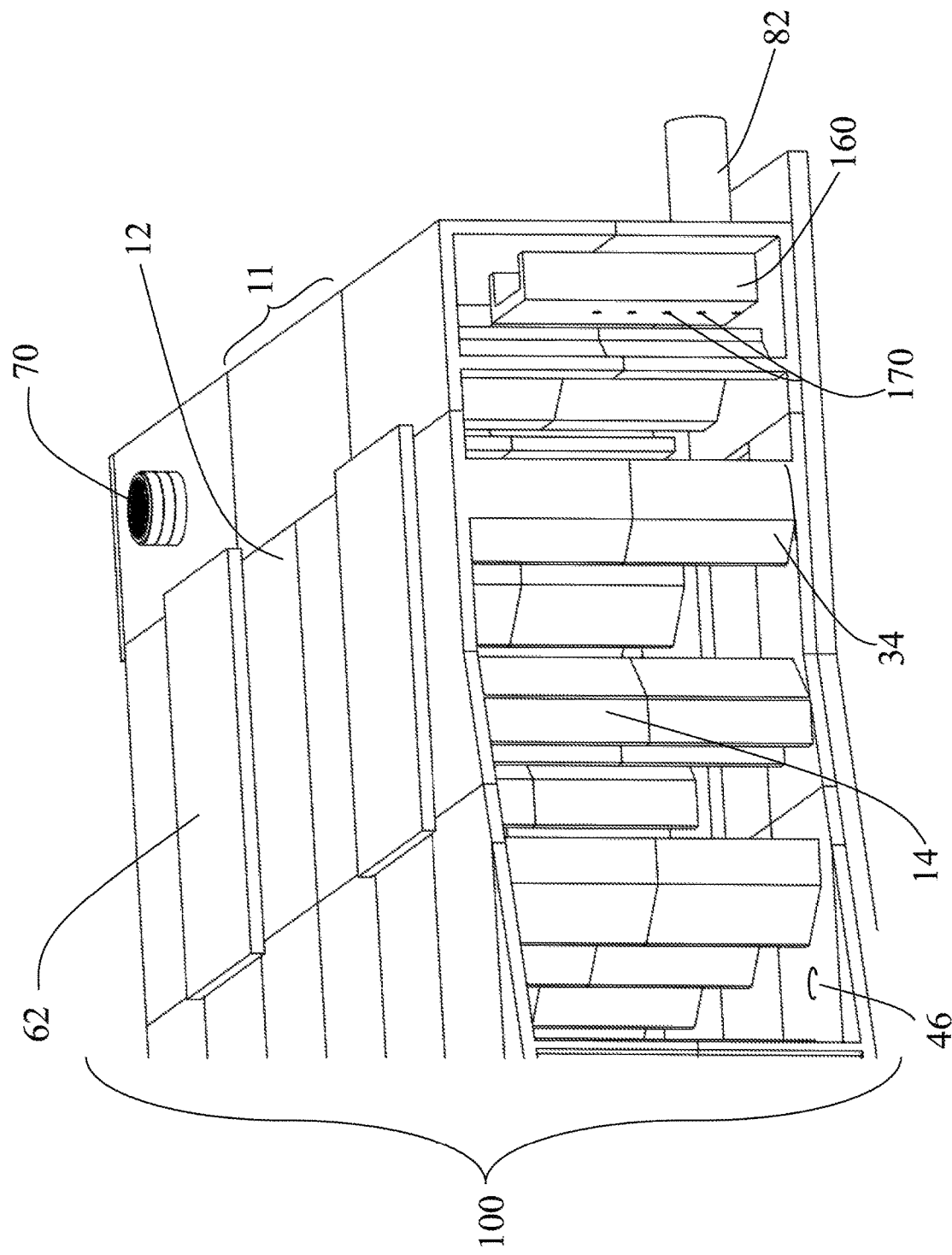
FIG. 21 illustrates a cut-away view of an outlet weir adjacent to the outlet pipe in a full assembly of top and bottom perimeter and internal modules, in accordance with one embodiment.

In preferred embodiments, an outlet weir 160 is connected to an exterior bottom module wall before an outflow pipe 82 (FIG. 21). An outlet weir may have one to many weir orifice(s) 170. An outlet weir with multi-level orifice configuration allows for a more efficient storage system design. Including multiple orifices allows the discharge rate to be more consistent during a drain down as the system is discharging the collected and treated liquid. Weir orifice(s) 170 also allow the flow rate of the drain down pattern to more closely mimic the pre-development hydrograph of the site where the entire storage assembly system 100 is located. This in turn reduces the size of the storage system, thereby reducing materials and maintenance costs.

In accordance with alternate embodiments, internal modules may be assembled as a top modular assembly only or a top and bottom modular assembly combination.

In preferred embodiments, internal modules may have configurations of two V shaped legs and perimeter modules having two legs and one side wall. The design of module legs 14 and 34 of general V shape, where each side of the V includes two short sides running parallel to one another, and at the opposite end of the intersection of the V, and the two longer sides are angled from the short side, extending inward toward each other where the sides of the V shape intersect (FIGS. 1 and 2).

Figure 1:
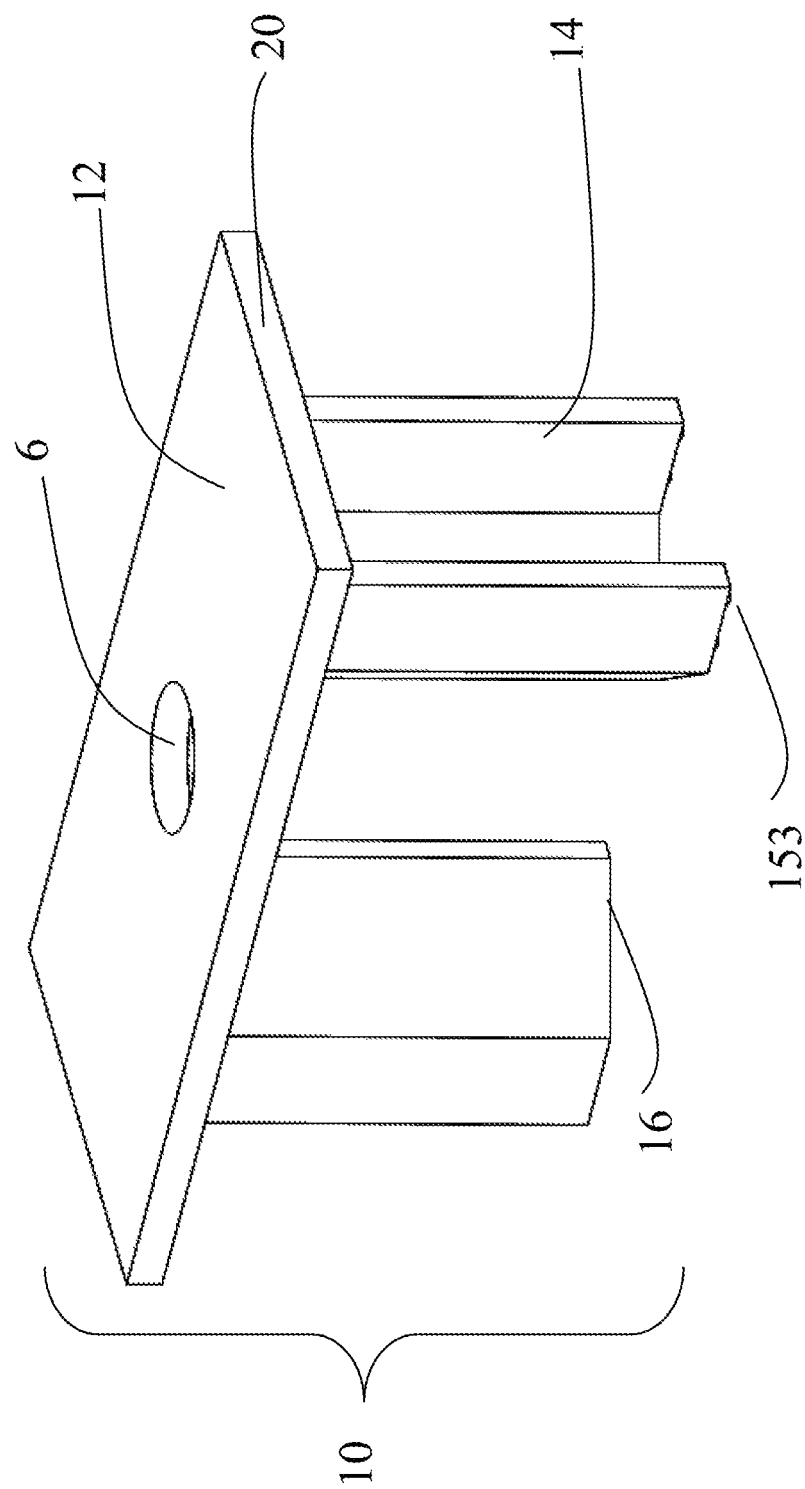
FIG. 1 illustrates a perspective view of the internal top module with two, inset v-shaped legs, in accordance with one embodiment.

FIG. 1 begins to illustrate an example of a tessellated module of the complete storage assembly 100 (not shown) with a four-sided internal top module 10 designed to collect and store water underground and is maintainable through the access hole 6. The top module is composed of a four-sided shaped top 12 and, in this embodiment, two legs 14. A preferred embodiment of the legs 14 configuration is a double V-shape. The top module top 12 also has a top module side edge 20 and the legs 14 have a top module bottom of leg 16 with a ball joint 153. While not shown in FIG. 1, a top module bottom of leg may have a joint other than a ball joint 153 as selected from joints shown in FIG. 19. The same is true for any module, top or bottom presented herein.

Figure 7:
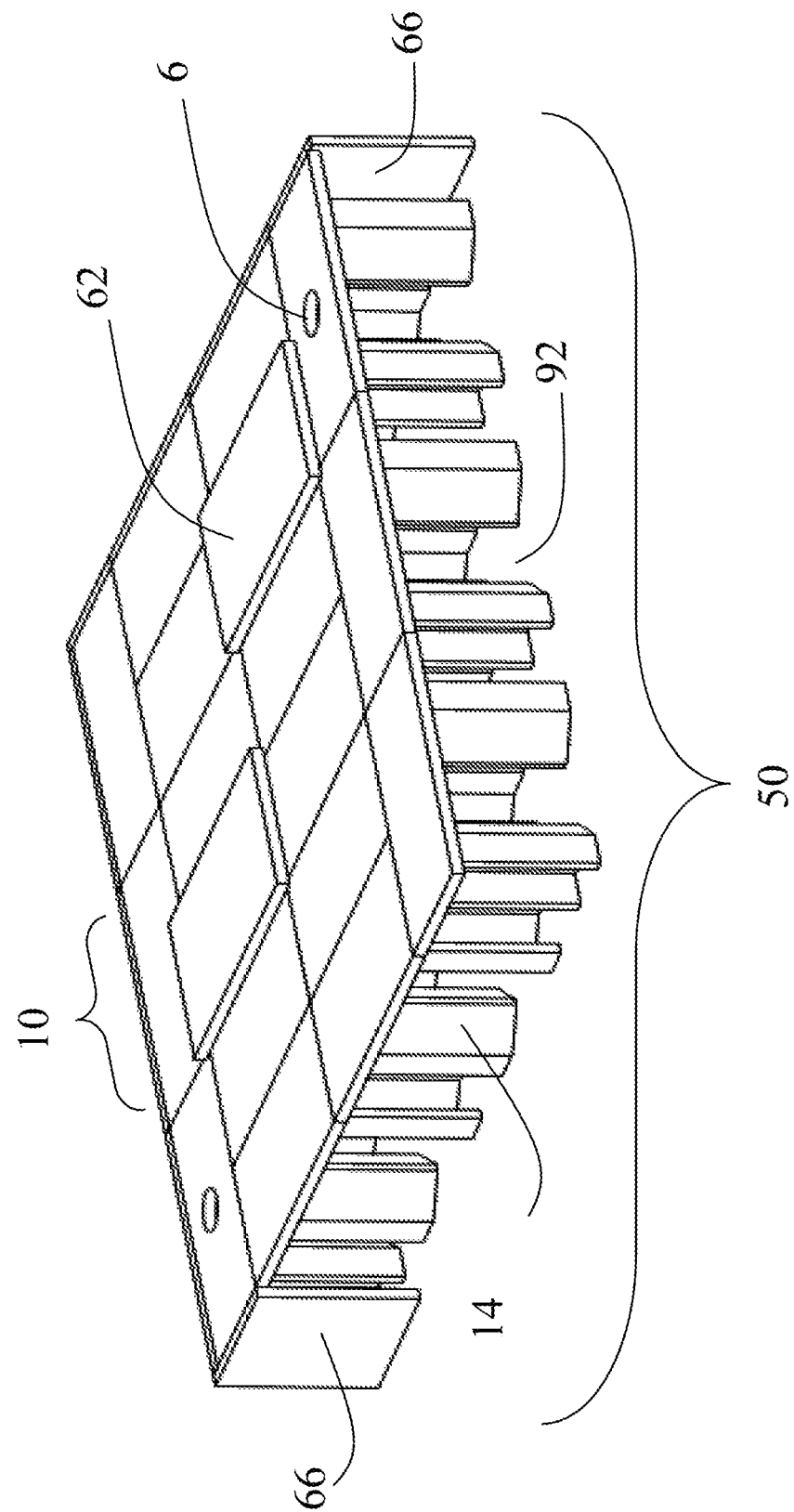
FIG. 7 illustrates a side cut-away view of a partial assembled top modules and side panels 66, in accordance with one embodiment.
Figure 8:
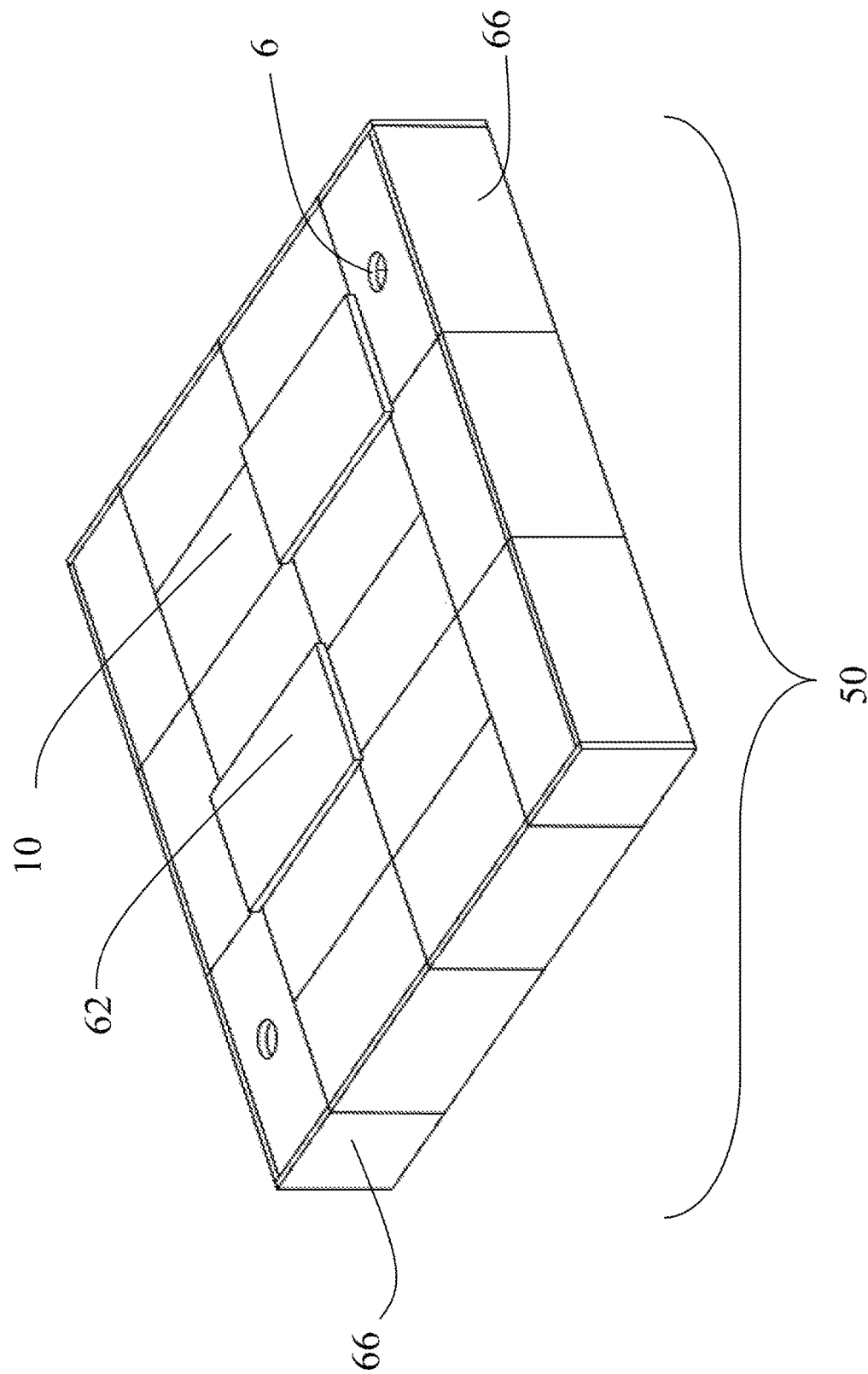
FIG. 8 illustrates a perspective view of the full assembly of the top modules of FIG. 7 with side panels 66, in accordance with one embodiment.

The tessellated module assembly 50 of FIGS. 7, and 8 represent one embodiment of an unstacked top module used in more shallow, underground cavities wherein the assembled top module may be placed directly on a foundation or compacted rock backfill rather than being assembled to a bottom tessellated module assembly.

FIG. 2 illustrates the internal four-sided top module shown in FIG. 1 in position for assembly with a corresponding internal bottom module 30. The four-sided internal top module 10 has top module top 12 with a top module side edge 20 and an access hole 6. This particular embodiment configuration includes two top module legs 14 with two top module bottom of legs 16 and ball joints 153. The internal bottom module 30 has a bottom module floor 32 with a drainage hole 46 and a bottom module side edge 21. The internal bottom module 30 also has two bottom module legs 34, each with a bottom module top of leg 36 and socket joints 154.

Figure 3:
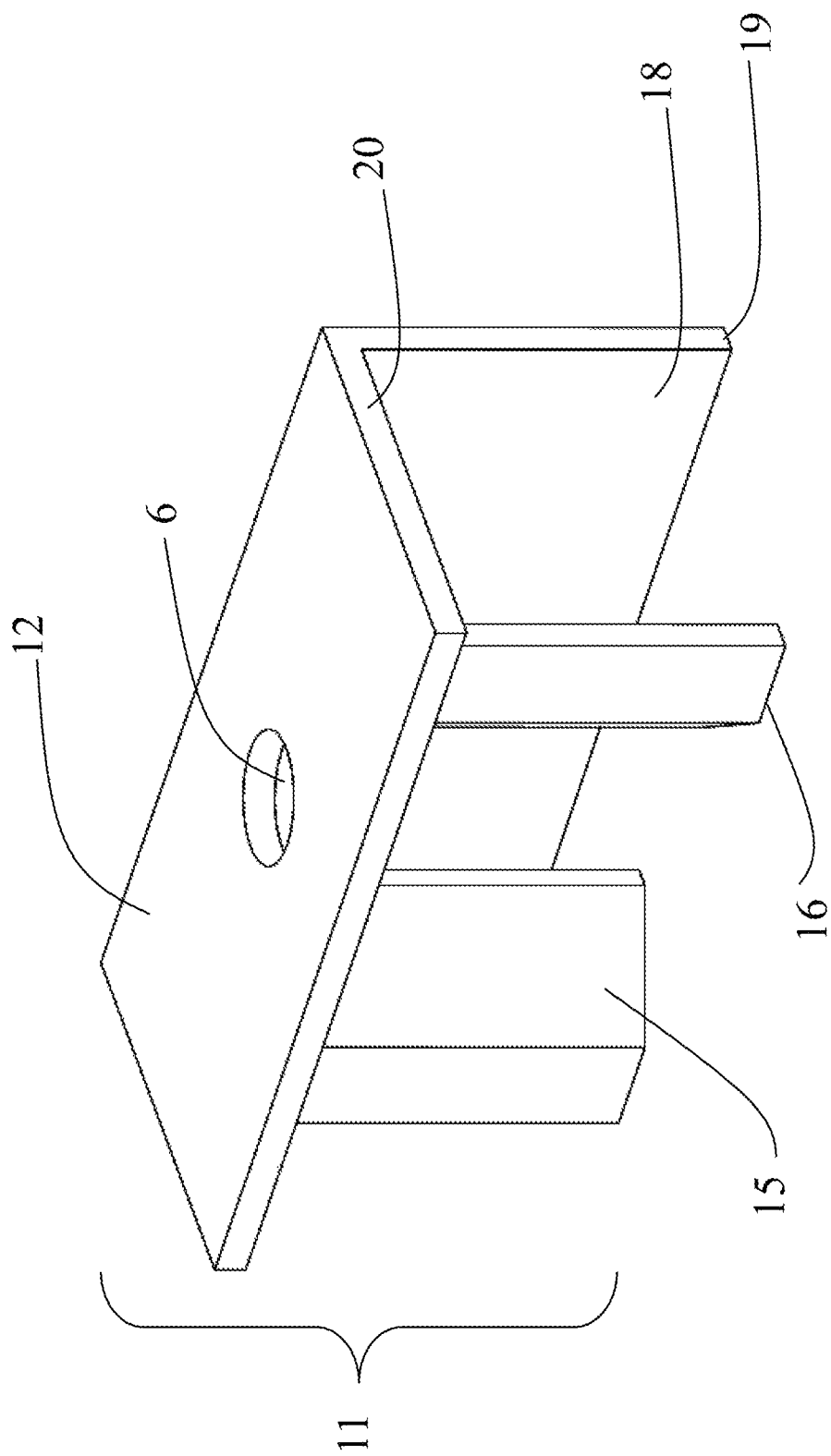
FIG. 3 illustrates a perspective view of a perimeter top module, in accordance with one embodiment.

FIG. 3 demonstrates a perimeter top module 11 with an access hole 6. While a perimeter module may have a combination of walls and legs, as seen in FIG. 7, the perimeter top module 11 has one top module side wall 18 with a top module bottom of wall 19 and a top module side edge 20. Additionally, it has one top module leg 14 with a top module bottom of leg 16 and a ball joint 153 (not shown). The perimeter top module 11 with one top module side wall 18 and one top module leg 14 may be stacked with a corresponding bottom perimeter module 31 as seen in FIG. 4 and may include side panels 66 (FIG. 7).

Figure 4:
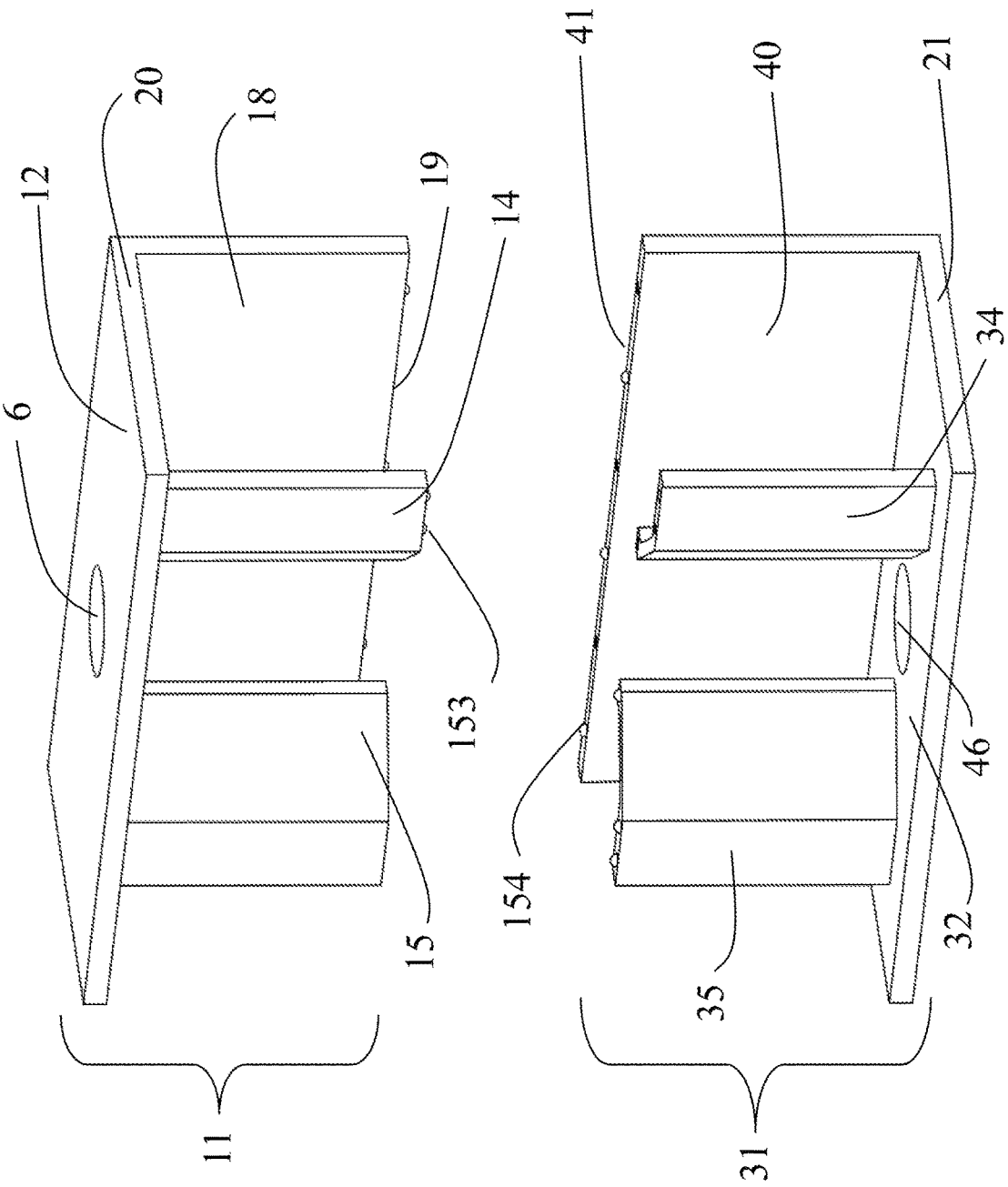
FIG. 4 illustrates a perspective view of a perimeter top and perimeter bottom module with two legs and one wall each, in accordance with one embodiment.

An embodiment of FIG. 4 illustrates both top and bottom perimeter modules (11 and 31). The perimeter top module 11 has two top module legs 14 and one top module side wall 18. The top module side wall 18 has a top module bottom of wall 19, ball joints 153, and a top module side edge 20. A perimeter top module may also have an access hole 6. The perimeter bottom module 31 also has a wall and two legs and a bottom module floor 32 with a drainage hole 46. The perimeter bottom module side wall 40 has a bottom module side edge 21 and a bottom module top of wall 41. The two bottom module legs 34 each have bottom module top of leg 36 and, in this embodiment, socket joints 154.

Figure 5:
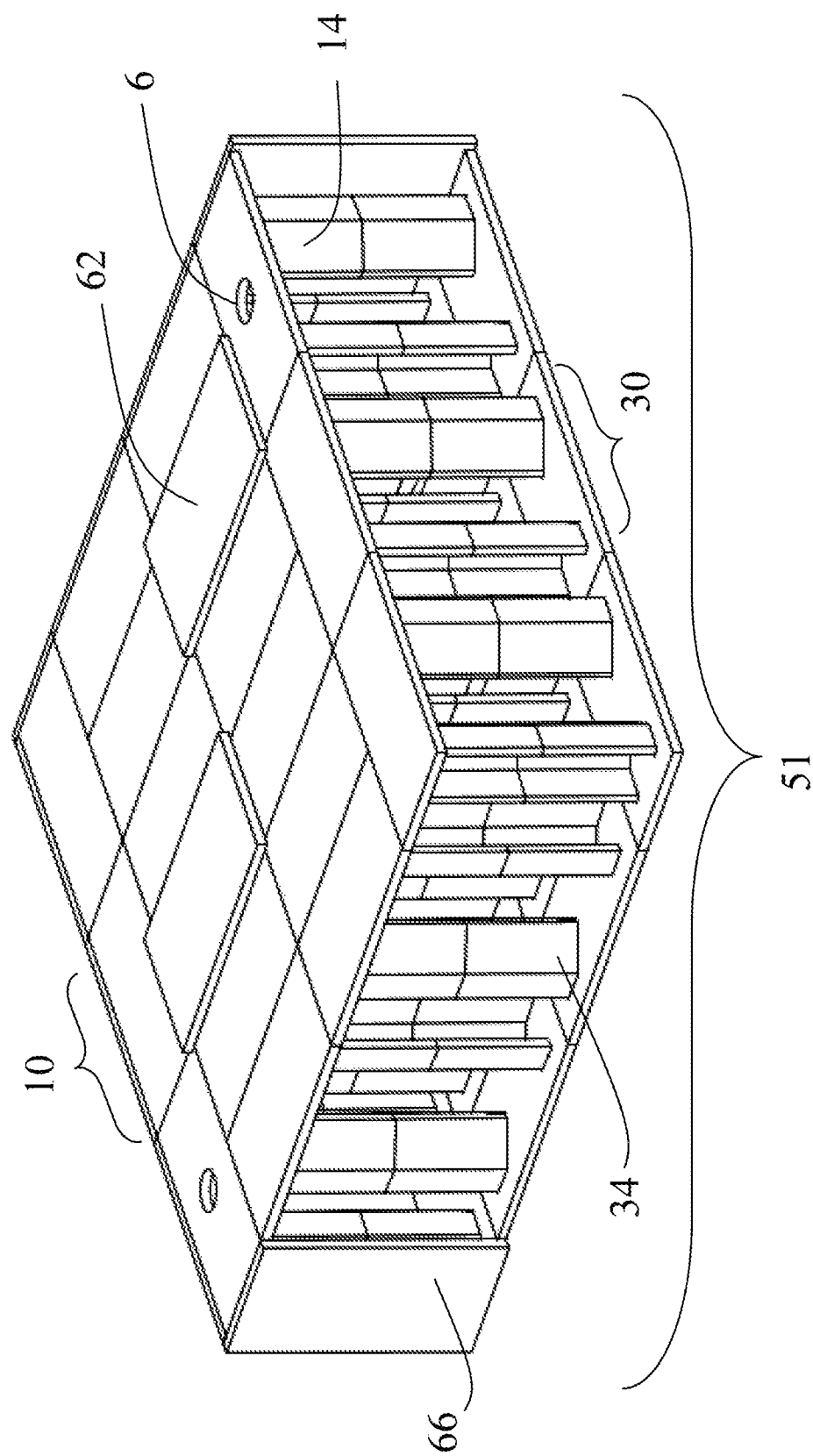
FIG. 5 illustrates a side cut-away view of a partial assembly of both top and bottom internal modules with side panels 66, in accordance with one embodiment.

FIG. 5 represents an embodiment of an assembly 100 of top 10 and bottom modules 30 layered. The top module portion includes perimeter top modules 11 with two top module legs 14, and internal top modules 10, and a perimeter top module 11. Additional elements of the assembly of FIG. 5 include: a top slab 62, an access hole 6, top module legs 14, and side panels 66. The lower modules of the assembly in the figure depict bottom module legs 34 and perimeter bottom modules 31.

Figure 6:
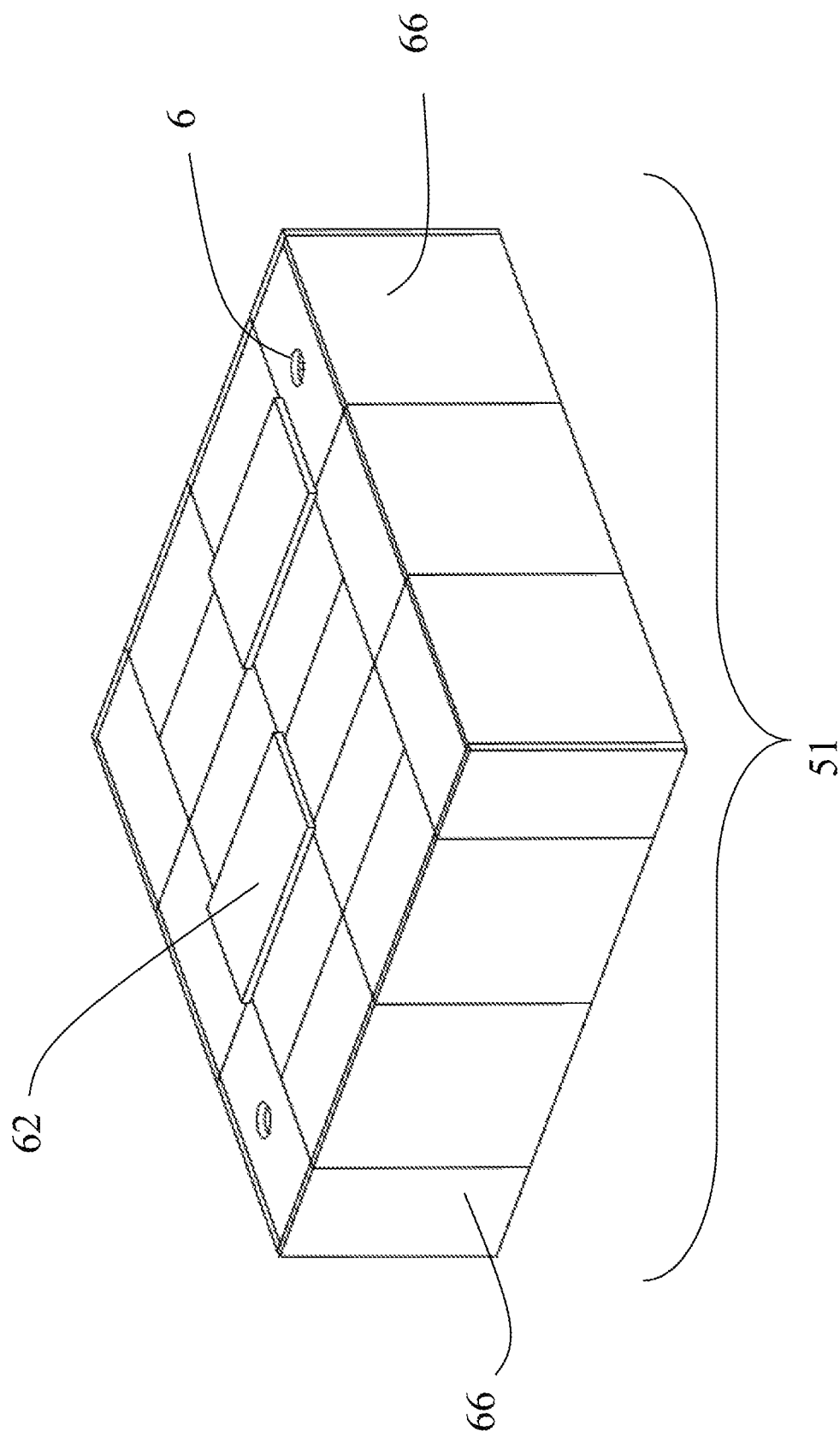
FIG. 6 illustrates a perspective view of the full assembly of FIG. 5 as an enclosed top and bottom modules assembly with side panels 66, in accordance with one embodiment.

FIG. 6 demonstrates a further embodiment of the storage system assembly 100 (first presented in FIG. 5) with top slabs 62 and side panels 66, which may be placed into shallow drainage areas.

FIG. 7 demonstrates an embodiment of a storage system assembly internal top modules 50 with top slabs 62 and side panels 66, which may be placed into shallow drainage areas. Other elements identified in FIG. 7 include: drainage holes 6, top slabs 62, top module side walls 18, internal top modules 10, top module legs 14 and internal void areas 92.

FIG. 8 presents a perspective view of assembled top modules 50 wherein the following elements are identified: top slabs 62, access holes 6, side panels 66, and internal top modules 10.

FIG. 9 presents a side cut-away view of an assembly 100 of stacked internal top 10 and perimeter top modules 11 and corresponding bottom internal and perimeter modules 30 and 31 wherein perimeter top module side walls 18, perimeter bottom module side walls 40 and side panels 66 at the corners demonstrate how the assembly 100 can be enclosed. Additional elements identified are: top slabs 62, access holes 6, top module roof 12, internal void areas 92.

Figure 10:
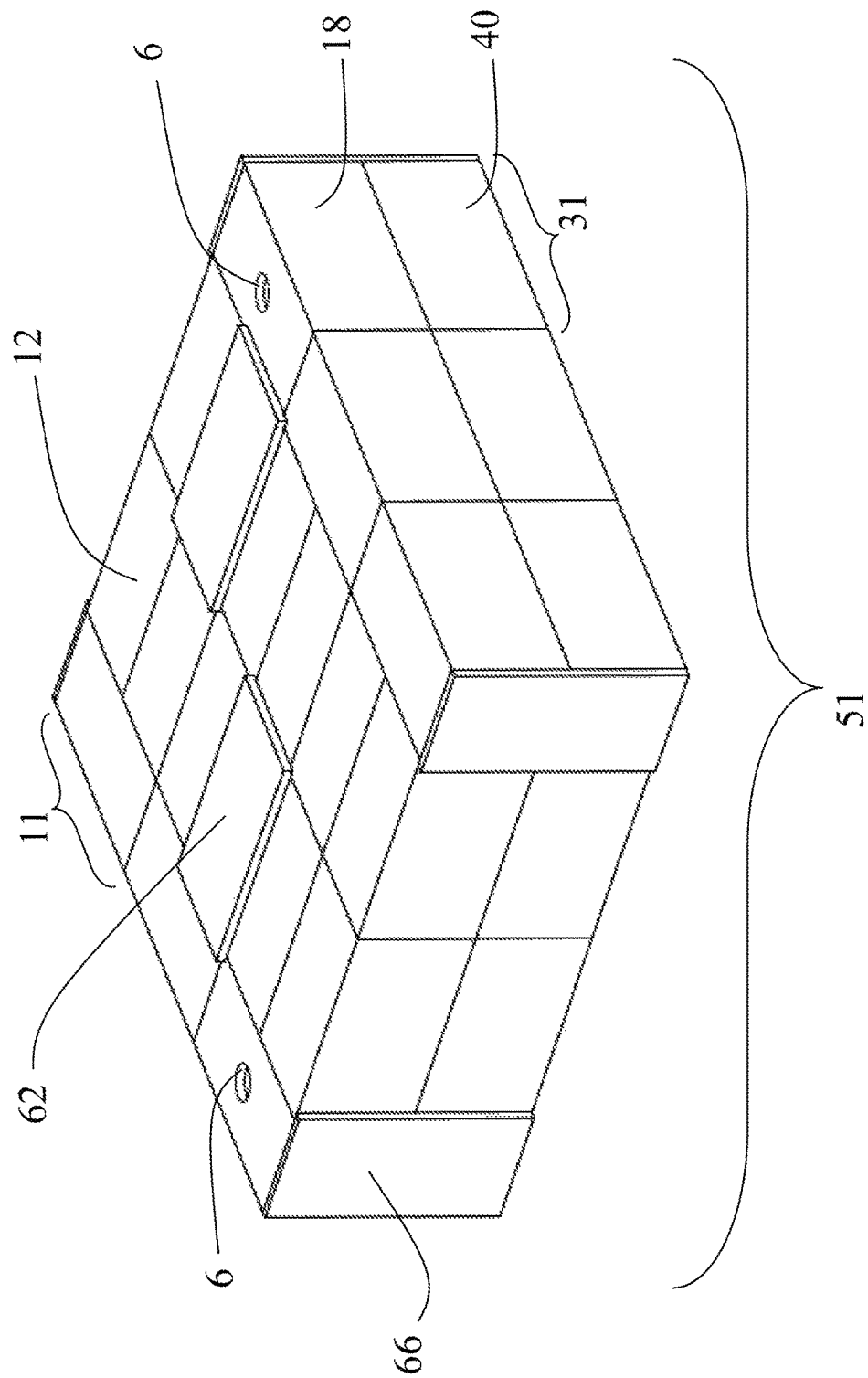
FIG. 10 illustrates a perspective view of the full assembly of the top modules and bottom internal modules and top of bottom perimeter modules with built-in side walls 18 and side panels 66 only at the corners, in accordance with one embodiment.

FIG. 10 presents an enclosed stacked storage system assembly 100 (of FIG. 9) wherein both top internal 10 and perimeter modules 11 and bottom internal 30 and perimeter modules 31 are present. Other elements depicted include: top module tops 12, top slabs 62, access holes 6, top module side walls 18, bottom module side walls 40, and side panels 66.

Figure 11:
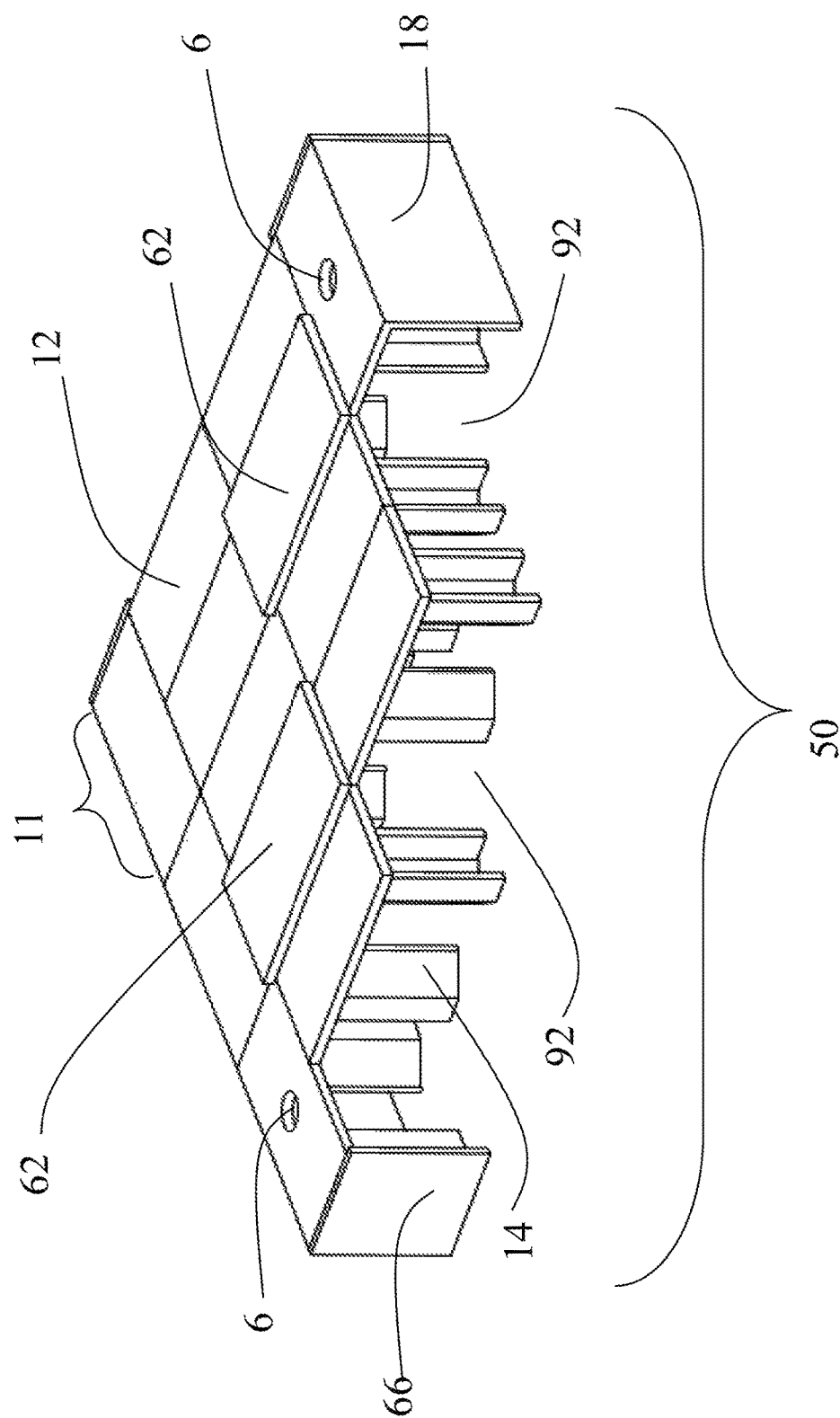
FIG. 11 illustrates a side cut-away view of a partial assembly of internal and perimeter top modules, in accordance with one embodiment.

FIG. 11 presents an embodiment wherein the system is comprised of an assembly of top modules only 50 and which include both internal 10 and perimeter top 11 modules. Elements identified include: perimeter top modules 11, top slabs 62, access holes 6, the top module tops 12, top module side walls 18, internal void areas 92, top module legs 14, and side panels 66. While all angles of the assembly are not shown, the attachment of side panels 66 can be distinguished from top module side walls 18 via the double line (layered) representation.

Figure 12:
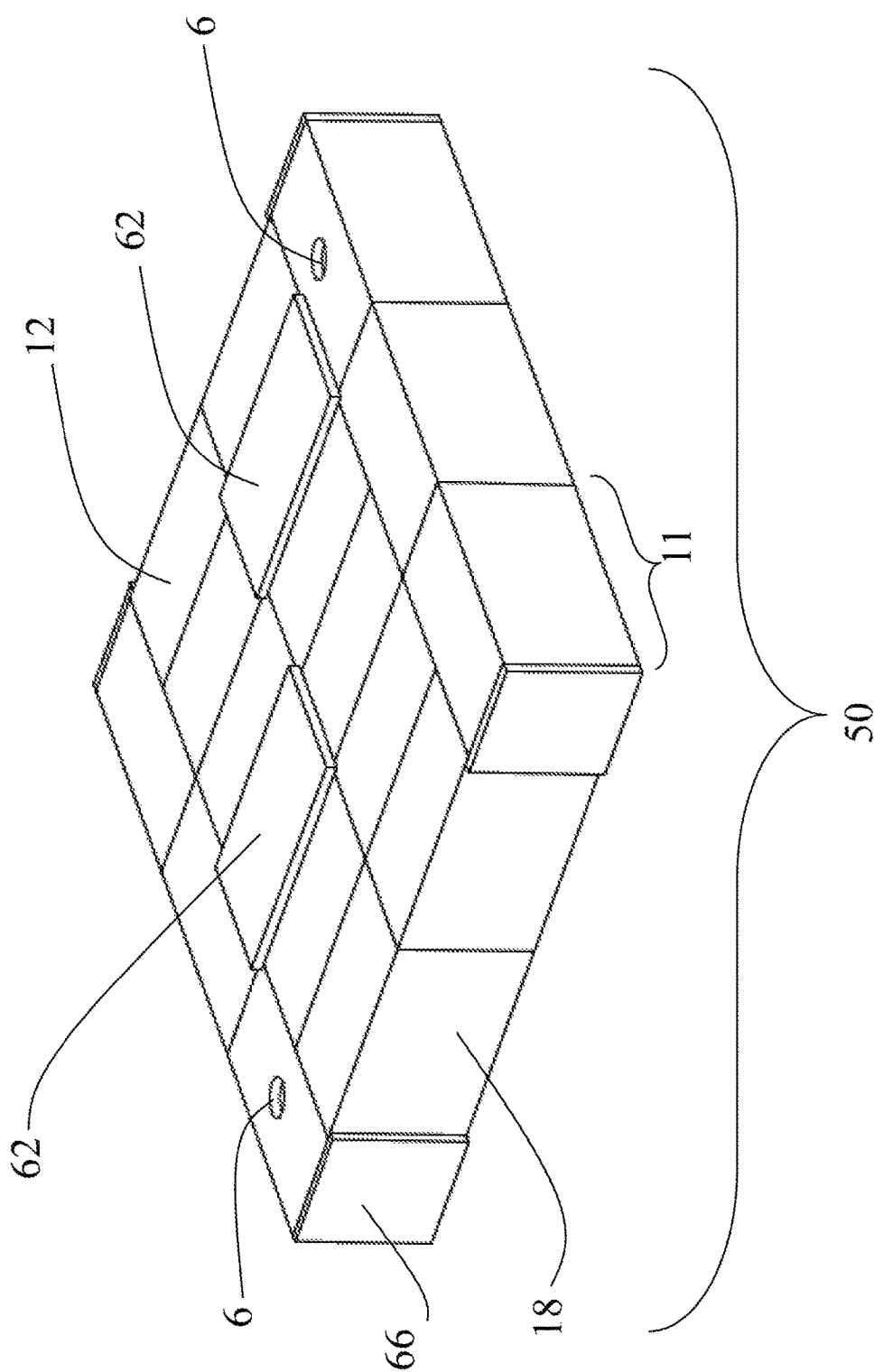
FIG. 12 illustrates a perspective view of a full assembly of internal and perimeter top modules of FIG. 11, in accordance with one embodiment.

FIG. 12 illustrates an enclosed assembly of top modules 50 including both internal and perimeter top modules (see FIG. 11). Elements of this embodiment identified include: top slabs 62, top module tops 12, access holes 6, top module side walls 18, and perimeter top modules 11.

Figure 13:
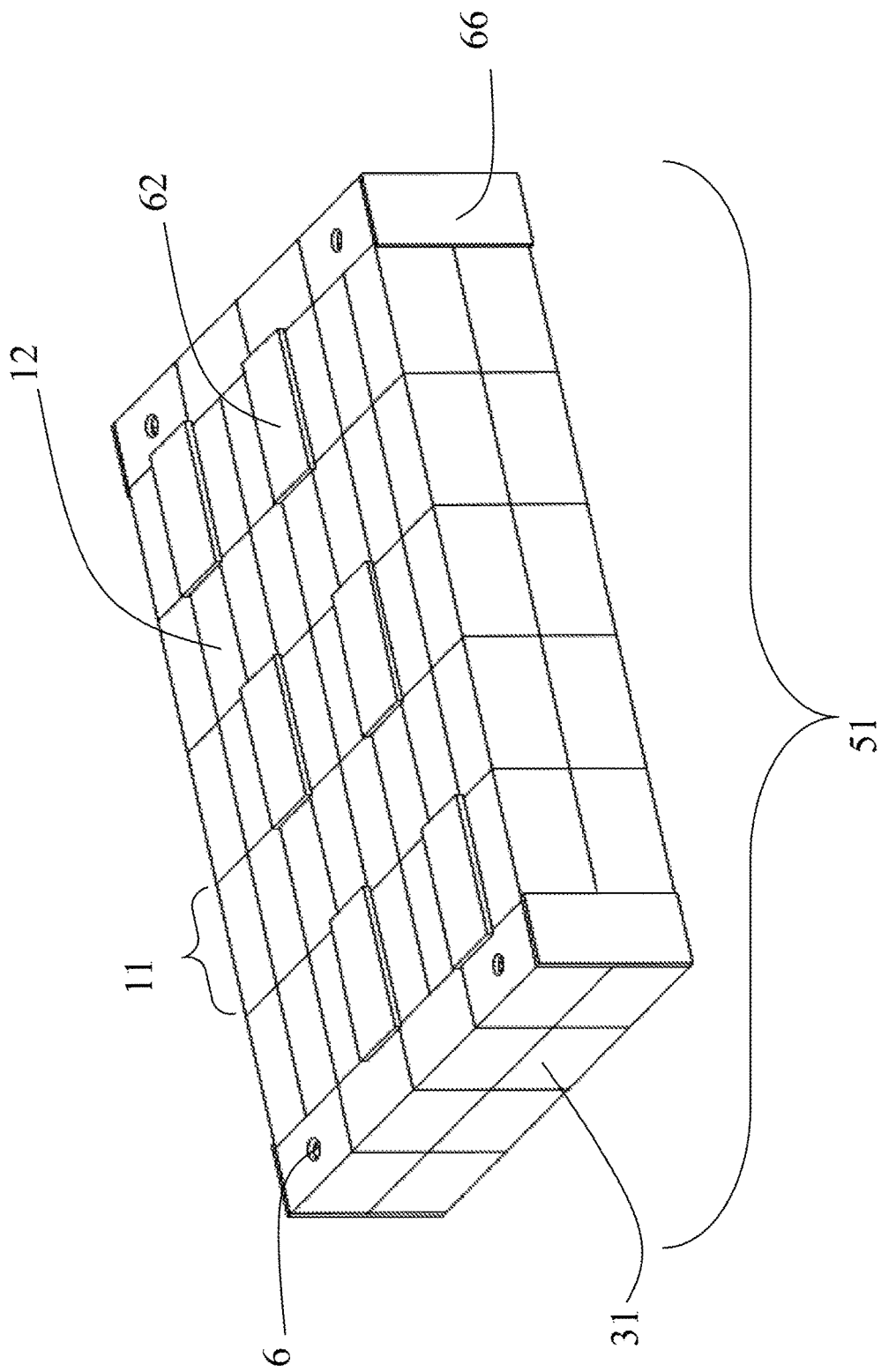
FIG. 13 illustrates a perspective view of the enclosed stacked top and bottom internal modules and perimeter modules as a larger assembly, in accordance with one embodiment.

FIG. 13 an embodiment wherein the storage system assembly 100 is larger than that presented in FIG. 10. Elements identified in FIG. 13 include: side panels 66, perimeter top modules 11, top slabs 62, the top module tops 12, and access holes 6.

Figure 14A:
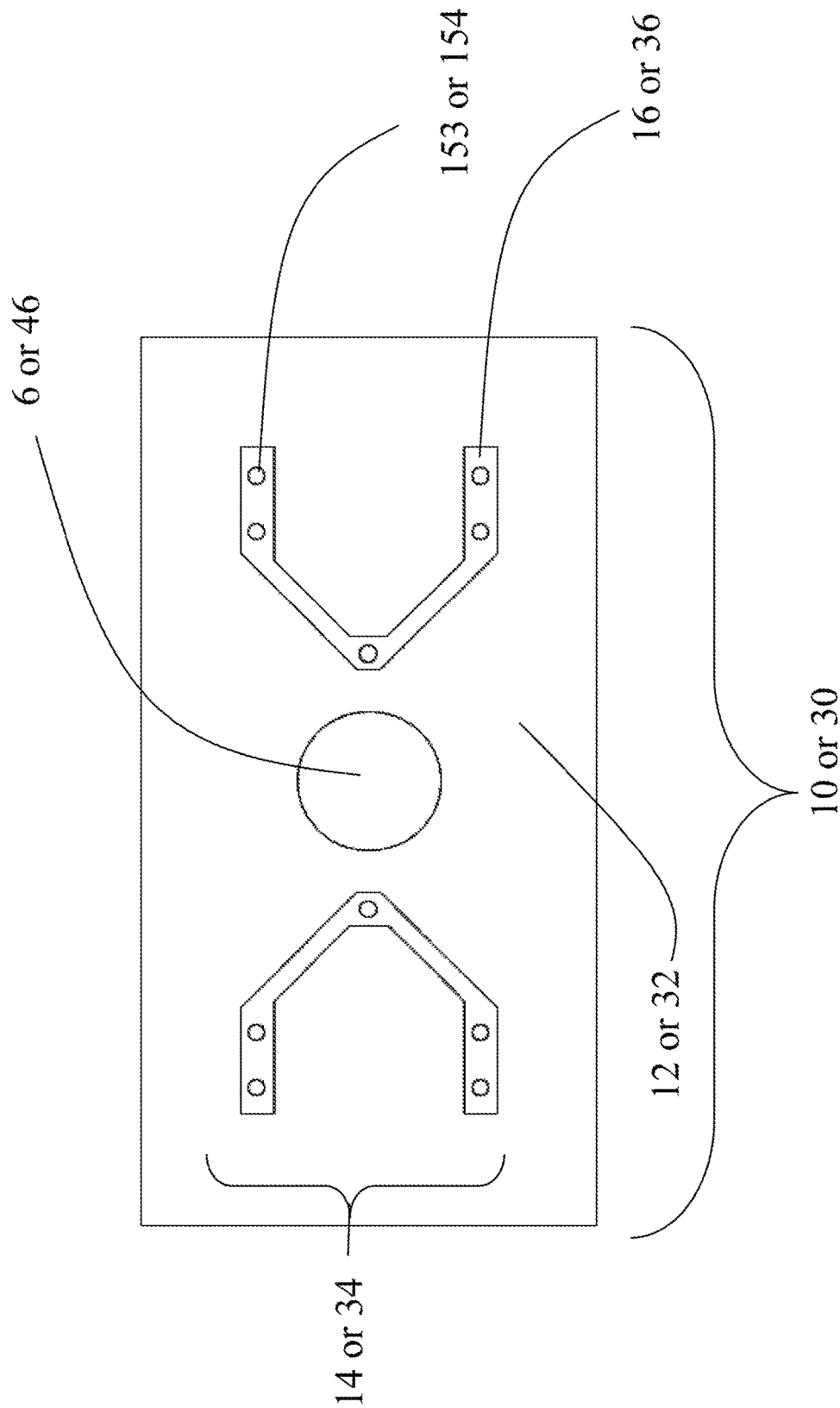
FIG. 14a illustrates an underside bottom or top view of an internal module and the double V shaped leg configuration and optional access hole, in accordance with one embodiment.

FIG. 14*a* illustrates the underside of an internal four-sided top module 10, which clearly depicts the top module bottom of leg 16, ball joints 153, the underside of the top module top 12, the top module legs 14, and an optional access hole 6. It is understood by the inventor that this configuration could be applied to an internal bottom module and the joints can be interchanged as disclosed in FIG. 19, for example, the ball joint 153 could be exchanged for socket joint 154 depending on the site conditions and engineering selections made at the time of installation. Further, the optional access hole 6 may be exchanged for a drainage hole 46 depending on whether the module is a top or bottom module.

Figure 14B:
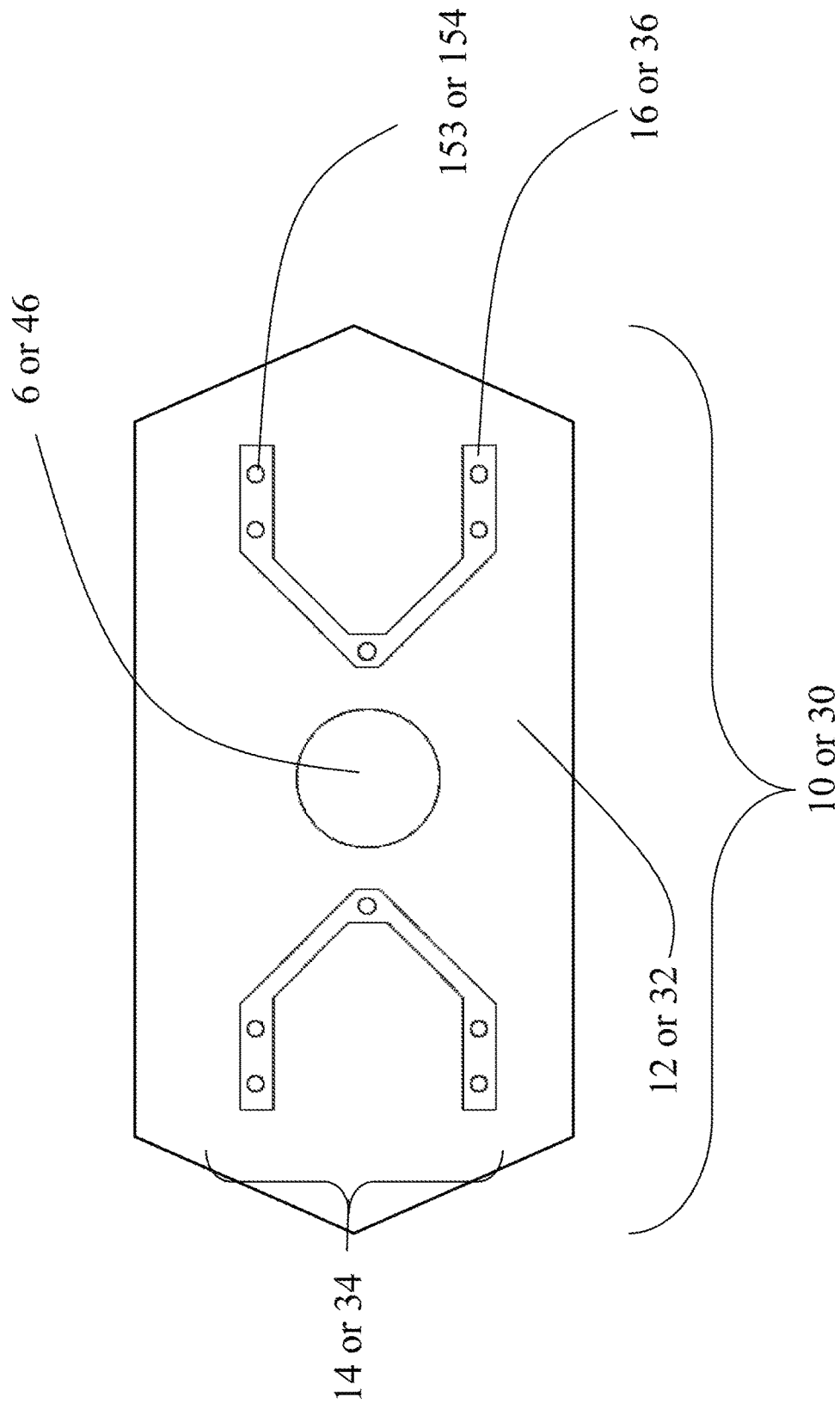
FIG. 14b illustrates an underside bottom or top view of an internal six-sided module and the double V shaped leg configuration and optional access hole, in accordance with one embodiment.

FIG. 14*b* illustrates the underside of an internal six-sided top module 10, which clearly depicts the top module bottom of leg 16, ball joints 153, the underside of the top module top 12, the top module legs 14, and an optional access hole 6. It is understood by the inventor that this configuration could be applied to an internal bottom module and the joints can be interchanged as disclosed in FIG. 19, for example, the ball joint 153 could be exchanged for socket joint 154 depending on the site conditions and engineering selections made at the time of installation. Further, the optional access hole 6 may be exchanged for a drainage hole 46 depending on whether the module is a top or bottom module.

Figure 14C:
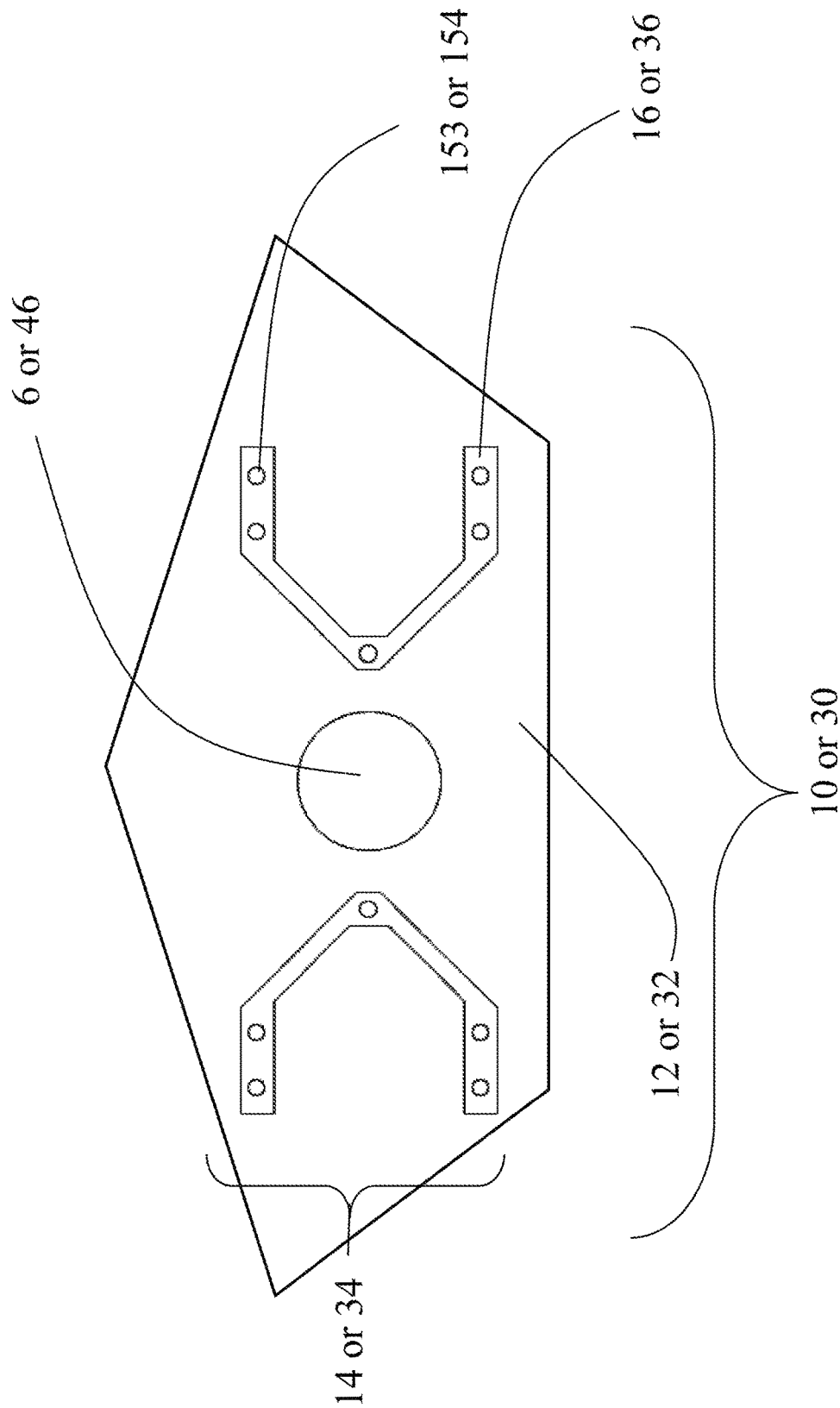
FIG. 14c illustrates an underside bottom or top view of an internal five-sided module and the double V shaped leg configuration and optional access hole, in accordance with one embodiment.

FIG. 14*c* illustrates the underside of an internal five-sided top module 10, which clearly depicts the top module bottom of leg 16, ball joints 153, the underside of the top module top 12, the top module legs 14, and an optional access hole 6. It is understood by the inventor that this configuration could be applied to an internal bottom module and the joints can be interchanged as disclosed in FIG. 19, for example, the ball joint 153 could be exchanged for socket joint 154 depending on the site conditions and engineering selections made at the time of installation. Further, the optional access hole 6 may be exchanged for a drainage hole 46 depending on whether the module is a top or bottom module.

Figure 14D:
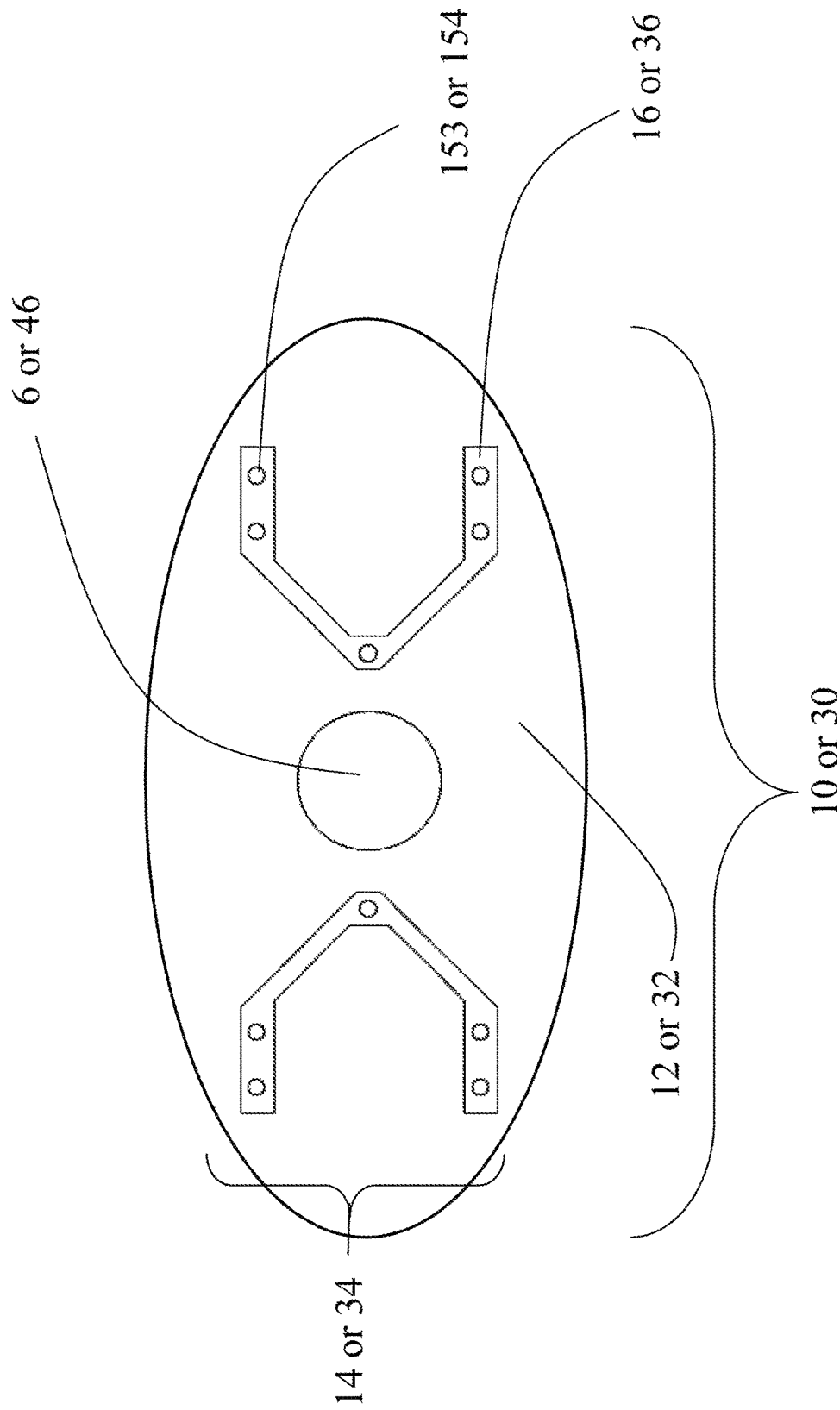
FIG. 14d illustrates an underside bottom or top view of an internal oval module and the double V shaped leg configuration and optional access hole, in accordance with one embodiment.

FIG. 14*d* illustrates the underside of an internal oval top module 10, which clearly depicts the top module bottom of leg 16, ball joints 153, the underside of the top module top 12, the top module legs 14, and an optional access hole 6. It is understood by the inventor that this configuration could be applied to an internal bottom module and the joints can be interchanged as disclosed in FIG. 19, for example, the ball joint 153 could be exchanged for socket joint 154 depending on the site conditions and engineering selections made at the time of installation. Further, the optional access hole 6 may be exchanged for a drainage hole 46 depending on whether the module is a top or bottom module.

FIG. 14*e* illustrates the underside of an internal four-sided top module 10, which clearly depicts a single large top module bottom of leg 16, ball joints 153, the underside of the top module top 12, the single large top module leg 14, and an optional access hole 6. It is understood by the inventor that this configuration could be applied to an internal bottom module and the joints can be interchanged as disclosed in FIG. 19, for example, the ball joint 153 could be exchanged for socket joint 154 depending on the site conditions and engineering selections made at the time of installation. Further, the optional access hole 6 may be exchanged for a drainage hole 46 depending on whether the module is a top or bottom module.

Figure 15:
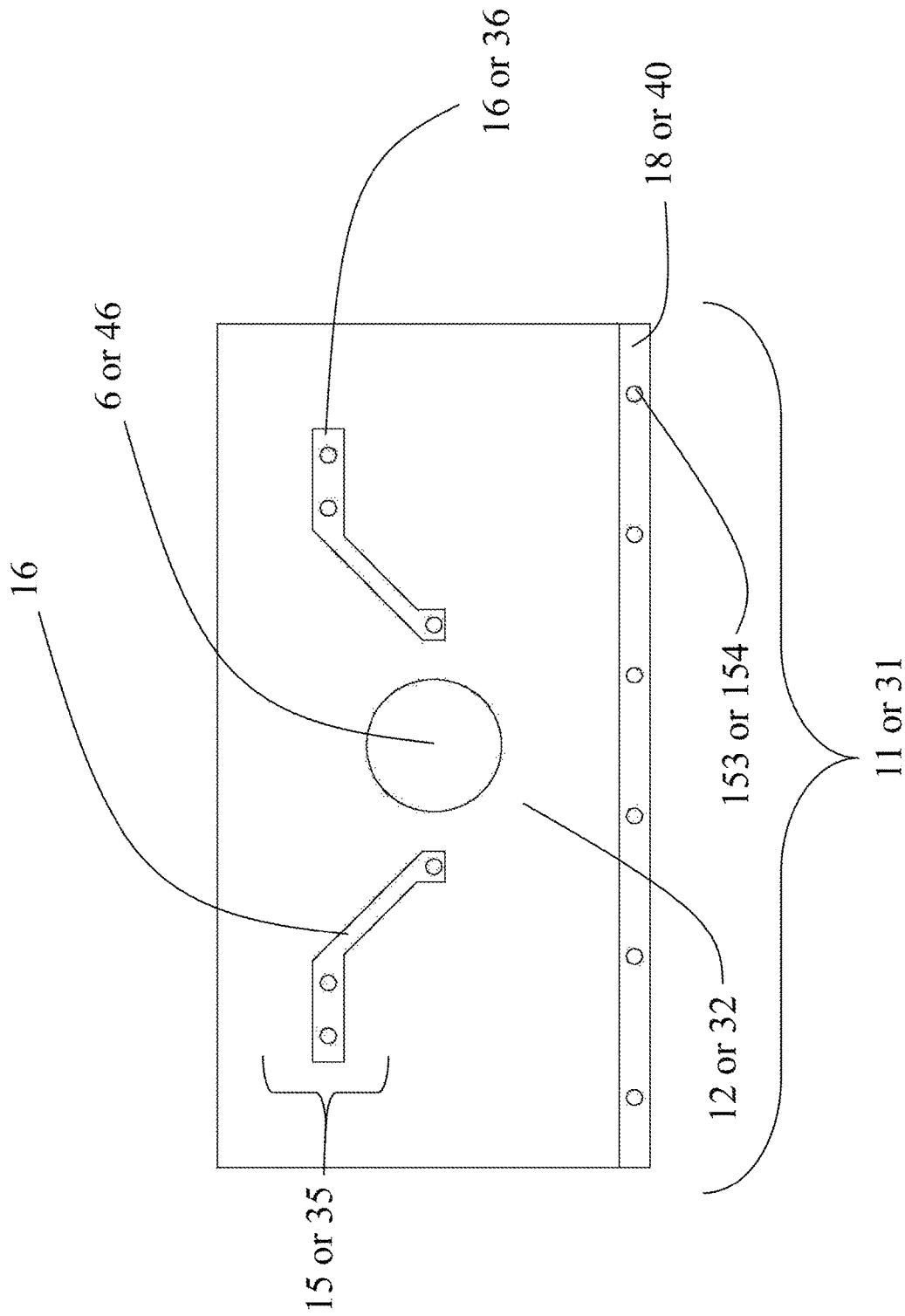
FIG. 15 illustrates an underside bottom or top view of a perimeter module and the leg and wall configuration and optional access hole, in accordance with one embodiment.

FIG. 15 illustrates the underside of a perimeter top module 11, which clearly depicts the top module bottom of leg 16, ball joints 153 along the top module side wall 18, the underside of the top module top 12, the top module legs 14, and an optional access hole 6. It is understood by the inventor that this configuration could be applied to an internal bottom module and the joints can be interchanged as disclosed in FIG. 19, for example, ball joint(s) 153 could be exchanged for socket joint(s) 154 depending on the site conditions and engineering selections made at the time of installation. Further, the optional access hole 6 may be exchanged for a drainage hole 46 depending on whether the module is a top or bottom module.

FIG. 16 illustrates a top view and bottom view of top slab 62 and a top slab notch down 68 which are used to create tessellated module assembly systems 100 (not shown in this figure).

Figure 17A:
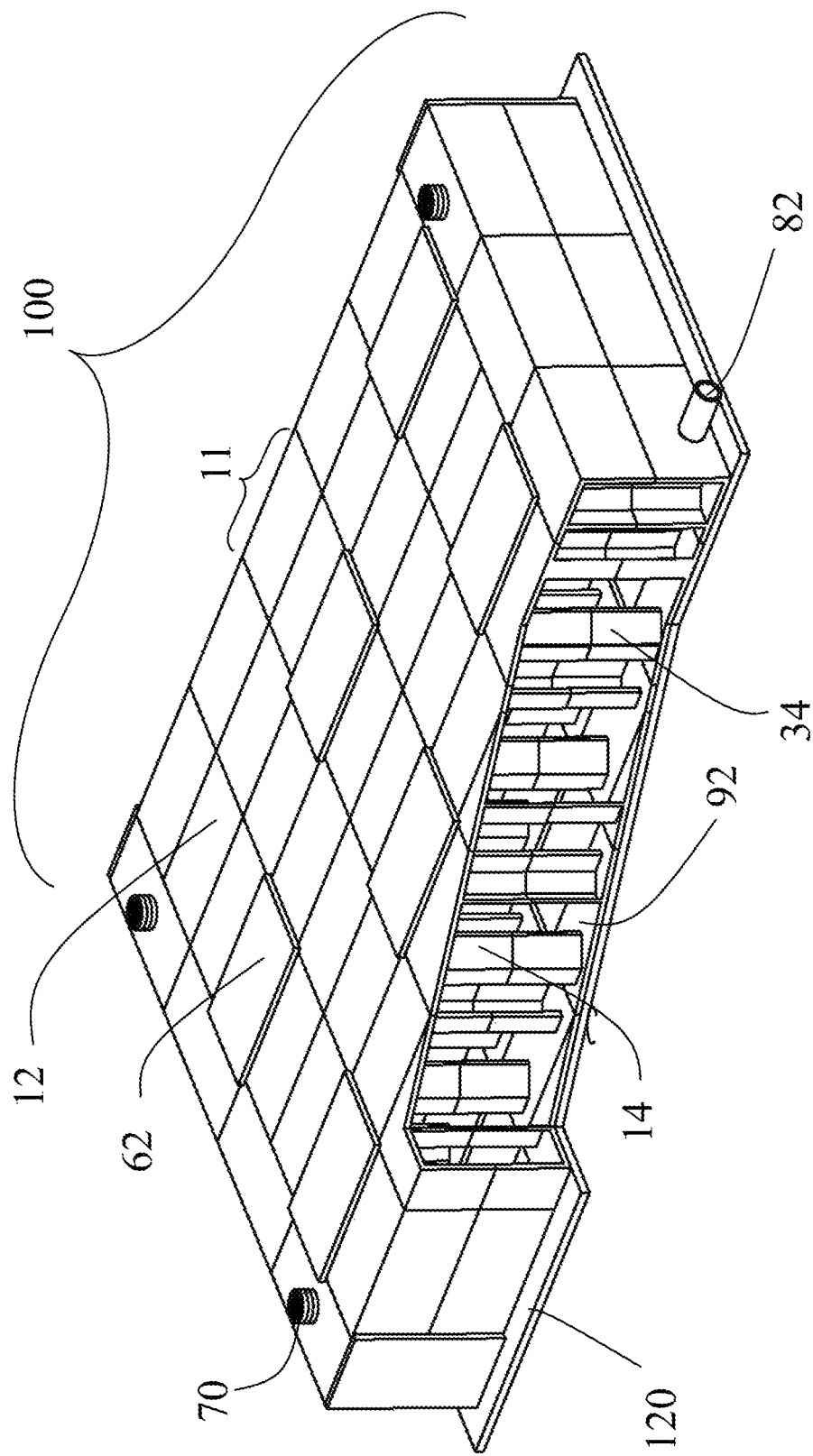
FIG. 17a illustrates a cut-away view of a full assembly of stacked top and bottom internal and perimeter modules with side walls at corners installed on a rock base, in accordance with one embodiment.

FIG. 17a illustrates a side cut-away view of a stacked storage system assembly with top and bottom modules 100 and also includes other features discussed but not previously presented in the figures, including: access risers and access hatch assemblies 70, an outflow pipe 82, and a gravel bed 120. Other elements also shown include: top slabs 62 (FIG. 16), the top module tops 12, top module legs 14, bottom module legs 34, perimeter top modules 11, and top module tops 12.

Figure 17B:
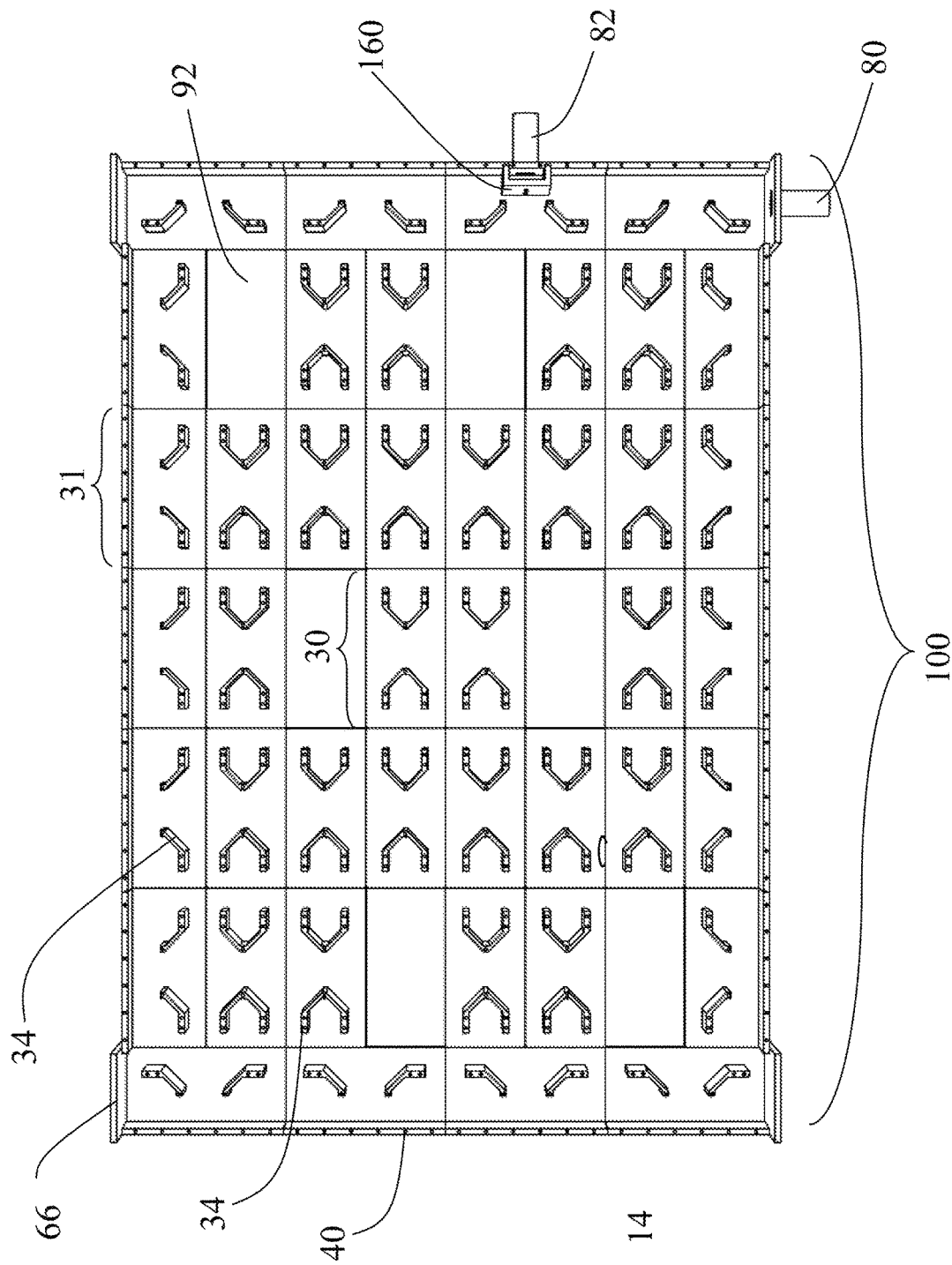
FIG. 17b illustrates a plan (top) cut-a-way view of a full assembly of stacked top and bottom internal and perimeter modules with side walls at corners, in accordance with one embodiment.

FIG. 17b illustrates a plane (top) cut-a-way view of a full assembly of stacked top and bottom internal and perimeter modules with side walls at corners, in accordance with one embodiment. With bottom modules 100 and also includes other features discussed but not previously presented in the figures, including: inlet pipe 80, an outflow pipe 82, and an outlet weir 160.

Figure 18:
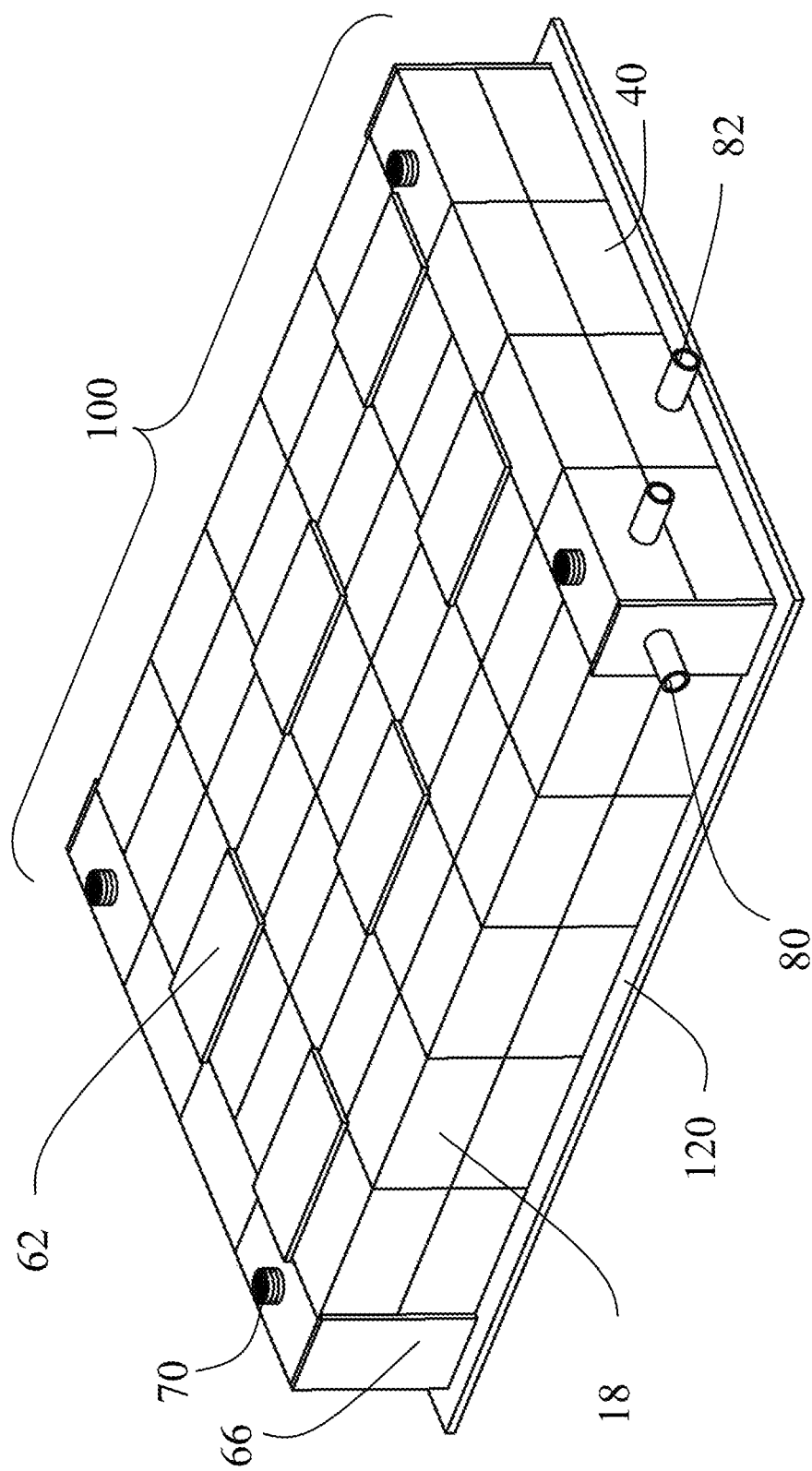
FIG. 18 illustrates a perspective view of a full assembly of stacked top and bottom internal and perimeter modules with side walls at corners installed on a rock base, in accordance with one embodiment.

FIG. 18 demonstrates a complete storage system assembly 100 as presented in FIG. 17 wherein the following elements are shown: access risers and access hatch assemblies 70, inflow pipes 80, an outflow pipe 82, and a gravel bed 120, top module side walls 18, bottom module side walls 40, side panels 66, and top slabs 62.

Figure 19:
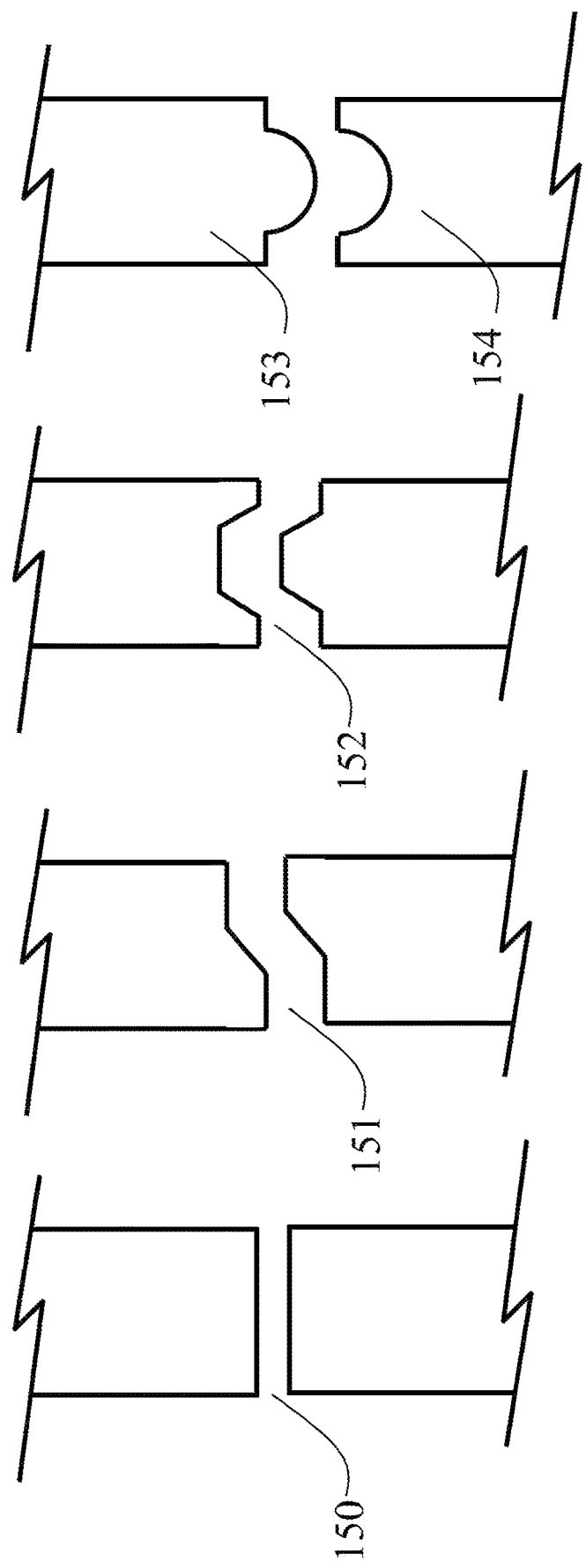
FIG. 19 a side view of various joint designs for the top and bottom legs, in accordance with one embodiment.

FIG. 19 demonstrates several types of connection joints to connect legs of top and bottom modules. From left to right, there is an example of top and bottom legs with no joint 150, or jointed, including: assembled via a ship lap joint 151, a groove joint 152, a ball joint 153 and a socket joint 154. The utilization of differing joints depends largely on the ambient soil load pressures of a particular site location.

Figure 20:
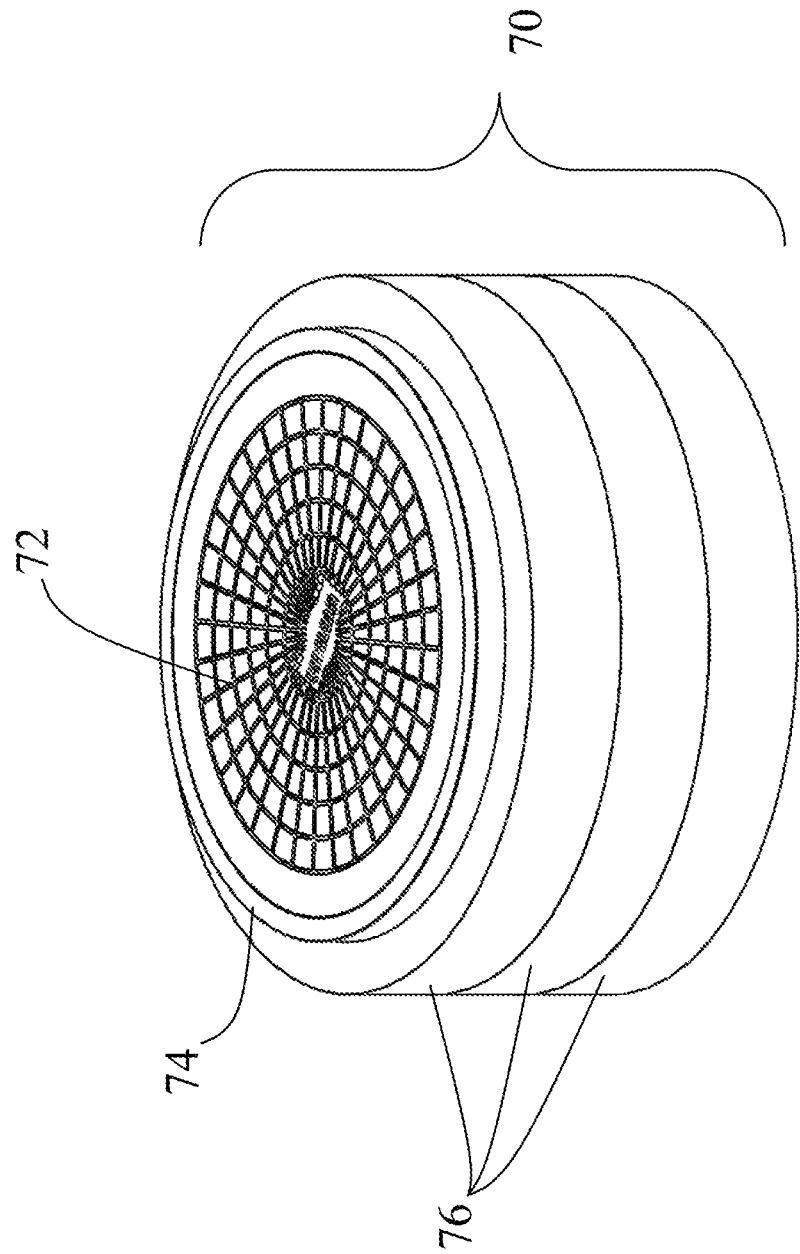
FIG. 20 illustrates an external perspective view of an access riser and access hatch assembly, in accordance with one embodiment.

FIG. 20 presents a detailed view of an access riser and access hatch assembly 70 with a manhole access cover 72, a manhole access cover frame 74, and manhole access risers 76.

FIG. 21 presents a perspective view of an outlet weir 160 adjacent to the outlet pipe 82 including multiple outlet orifices 170 in a full assembly 100 of top and bottom perimeter and internal modules. Also presented are top slabs 62, an access riser and access hatch assembly with a manhole access cover 72, a drainage hole 46, top module roof 12, perimeter top modules 11, top module legs 14, and bottom module legs 34.

Figure 22:
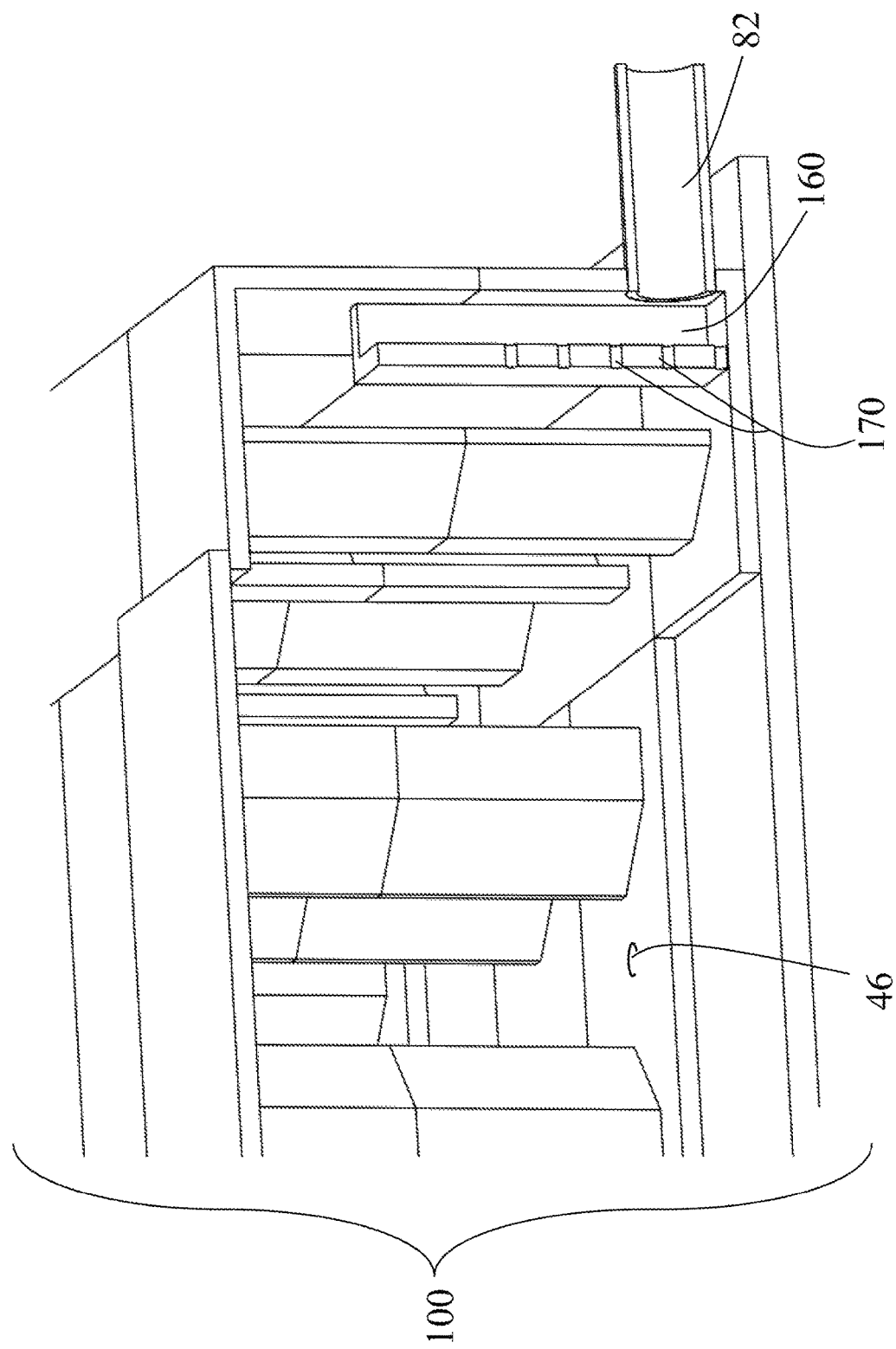
FIG. 22 illustrates a close-up cut-away view of an outlet weir with multi-level orifices for enhanced flow control of FIG. 21, in accordance with one embodiment.

FIG. 22 presents a cut-away view of the outlet weir 160 adjacent to the outlet pipe 82 including multiple outlet orifices 170, and a drainage hole 46 in a full assembly 100 of top and bottom internal and perimeter modules.

In certain embodiments, the tessellated module and assembly of modules include joint lines between modules which can be sealed with a waterproof sealant or the entire module assembly wrapped in a plastic liner to make the storage system water tight.

Conjoining of the modules is not limited to joints wherein differing construction environments may require different assembly methods, to increase, for example, the strength of the assembled module, may be employed and are possible and have been contemplated without departing from the scope of the present disclosure.

The internal top module 10 can be used in conjunction with other four-sided internal top modules 10, placed side-by-side, to create a tessellated module assembly 50 as represented in FIG. 7. The assemblies 50 made of four-sided top modules 10 can only be made so tall due to manufacturing limitations of the top modules side wall 18 height. When taller module assemblies 51 are required as represented in FIG. 5, the top module 10 can be stacked on top of a bottom module 30 to form a taller assembled module 51. This taller assembled module can be twice as tall as a single top module 10 therefore resulting in taller tessellated module assemblies 51 capable of storing larger volumes of water. External top 11 and bottom 31 modules are placed around the perimeter of the assembly 51 to define its outer extent.

The tessellated module assemblies 100 construction from many internal and perimeter top modules 10, 11 or stacked with internal and perimeter bottom 30, 31 assembled modules are placed side-by-side in rows to create various shapes that are all arranged in a tessellated pattern as in FIGS. 9 and 10. As the number of stacked top 10 and 11 and bottom 30 and 31 internal and perimeter modules grow the more flexibility there is to vary the shape of the complete storage assembly 100 into four-sided, rectangles, L shapes, S shaped, U shaped and other shapes required to fit within the construction site constraints.

Referring to FIGS. 17 and 18, in certain embodiments, the individual modules have to be configured so that each module is in fluid communication with one another to allow water to fill up all modules evenly 92. This is achieved through minimization of perimeter top modules 10 and 11, side walls 18, and perimeter bottom modules 30 and 31, bottom side walls 40 by only placing them along the perimeter of the complete storage system assembly 100. Modules 11 and 31, located on the perimeter of the tessellated module assembly 100, will have solid top side walls 18, bottom side walls 40 and optional side panels 66 as the complete storage system assembly 100 will be buried underground and be surrounded in soil.

The present technology's enhanced function of the tessellated module assembly has improved performance, functionality and accessibility of the complete storage system assembly 100 by allowing water to freely flow and fill the assembly in all directions as shown in FIG. 17. The cantilevered V shaped legs are well spaced apart in both directions allowing for very easy access for maintenance crews to walk around inside the system during maintenance activities.

Additionally, as in FIG. 18 and FIG. 20, access riser and hatch assemblies 70, which are composed of a manhole cover 72, manhole cover frame 74, and one or more manhole access risers 76 bring the assembly 70 up to ground level. Access into the tessellated module assembly 100 is provided via this access riser and hatch assembly 70 (FIG. 20) or via a hole 6 in the top 12 of the top module 10 (FIG. 1).

Because of the complete storage system assembly 100 is a tessellated array, each individual module 11 and 31 along the perimeter is supported and connected by at least two or three adjacent modules 10, 11, 30 and/or 31, two modules 11 and 31 in the corners and three modules 10, 11, 30 and 31 along the sides. The corners may be further reinforced by side panels 66 (FIG. 18). The load distribution of this configuration is optimized due the to the tessellated configuration of the complete storage system assembly 100. Outer perimeter modules 11 and 31 make contact with other modules 10, 11, 30 and 31 and the contact is made at ninety degree angles so the load on the perimeter modules 11 and 31 is dispersed evenly to other modules 10, 11, 30 and 31. This even load disbursement provides the complete storage system assembly 100 with maximum compression strength and thus able to handle soil pressures associated with deep installations.

Furthermore, referring to FIGS. 6, 8, 10, 12, 13, and 18, because of the load distribution among modules 10, 11, 30 and 31, and because the double V shaped mirrored cantilevered leg designs of the modules also minimizes deflection and contributes to load distribution, some of the inner modules 10 and 30 can be removed, usually in a checkerboard pattern for adjacent rows and columns in a complete storage system assembly 100. The tessellated shaped pattern of the complete storage system assembly 100 allows for the removal of the inner modules 10 and 30, without loss of strength. The internal void area 92 reduces the number of internal modules needed (10 and 30), and reduces the overall cost of the complete storage system assembly 100. In some cases, two adjacent modules (10 and 30) in the same row or same column can be removed without sacrificing strength of the complete storage system assembly 100. Overall the system is more efficient and more economically feasible due to less material being used to store the same amount of water along with decreasing the overall shipping costs that would be associated with additional internal modules 10 and 30.

Referring to FIG. 16, additional top slabs are used to cover the module assembly internal void areas 92 to create an enclosed chamber. For locations where a single module 10 and 30 is removed, FIG. 11, as an example, depicts a top slab 62 can be placed over the void 92. This top slab 62 is designed with flat top, of various thicknesses to handled surface loading conditions, and further have a notch down 68 on their bottom sides, as depicted in FIG. 16, in accordance with one embodiment. Further, as an example, FIGS. 8, 10, 13, and 18 lock the top slab 62 in place when placed over the internal void areas 92. The notch down 68 is slightly narrower than the internal void area 92 on all sides and the top slab 62 larger than the void areas 92, in accordance with a further embodiment.

FIGS. 17 and 18 are side-views of a complete storage system assembly 100 indicating how inflow pipes 80 and outflow pipes 82 can enter the complete storage system assembly 100 at various positions on the side walls 18, 40 and/or panels 66 of the modules 11 and 31. The positions of the top slab 62 are also shown sitting above the module top 10 and forming a roof over the complete storage system assembly 100 as depicted in one embodiment.

FIG. 18 is an illustrated embodiment of a top-view looking down on the 100 and the resulting tessellated pattern is formed. Access riser and access hatch assemblies 70 are positioned throughout key points in individual module tops 10, allowing access into the complete storage system assembly 100 through access holes 6 for maintenance and cleaning of the complete storage system assembly 100.

In accordance with one embodiment, FIG. 21, is a side-cut-away view of the storage system assembly 100 near an outlet pipe showing certain elements of the system including drainage holes 46, top module legs 14, bottom module legs, an outlet weir 160 with weir orifices 170, and an outlet pipe 82.

In accordance with another embodiment, FIG. 22 represents a close-up cut-away view of an outlet weir 160 with multiple weir orifices 170, adjoined to an outlet pipe 82. An outlet weir may have one to many weir orifice(s) 170. An outlet weir with multi-level orifice configuration allows for a more efficient storage system design by allowing discharge rates of liquid exiting the assembly system 100 to be of a more consistent rate during a drain down when system is discharging the collected and treated liquid. Other mechanisms for liquid discharge is presented in FIG. 22 with the inclusion of an optional drainage hole 46.

In an additional embodiment, the modules can be set up with perimeter and bottom modules 31 and side walls 66 and having a solid floor section to detain or retain water. If infiltration of storm water into native soil is allowable or desired, the floor of each bottom module can include a drainage hole 46 to allow captured storm water to exit through the bottom 32 of each bottom module (30 and 31) into the underlying rock base 120 layer and or native soil for ground water recharge. FIGS. 17 and 18, present a gravel base 120; however, it is understood that this representation is an example and that other representations, for example, a concrete slab, native soil are possible and contemplated without departing from the scope of the present disclosure.

In yet another embodiment, FIG. 20 shows three components of the access riser and access hatch assembly 70 which consists of one or more manhole access risers 76 to bring the manhole access cover 72 and frame 74 up to ground level.

In another embodiment, drainage holes at the bottom of a module allow storm water to fully drain out through the bottom 32 of each bottom module (30 and 31) preventing standing water. FIG. 12 illustrates one embodiment of assembled bottom module with drainage hole 46, however, a module assembly may contain zero to many drainage holes 46 placed in the bottom modular floor 32 of the internal bottom module floor 30 when infiltration of water back into the native soil below the complete storage system assembly 100 (not shown) is desired. Drainage holes 46 allow water to exit the system evenly throughout every bottom module 30 and 31. To connect the complete storage system assembly 100, both inflow pipes 80 and outflow pipes 82 (as seen in FIG. 18) can be connected to the complete storage system assembly 100 through any of the module side walls.

In some embodiments, a tessellated complete storage system assembly 100 as exampled in FIG. 23 for the underground collection and storage of water are built to handle site specific loading conditions. Surface loads applied to underground storage systems vary based upon pedestrian and vehicular traffic, and can be broken down into the following categories may be employed and are possible and contemplated without departing from the scope of the present disclosure.

Parkway loading includes sidewalks and similar areas that are adjacent to streets and other areas with vehicular traffic. Indirect traffic loading includes areas that encounter daily low speed traffic from vehicles ranging from small cars up to semi-trucks. Direct traffic loading includes areas, such as streets and interstates that encounter a high volume of high speed traffic from vehicles ranging from small cars to large semi-trucks. There is also heavy duty equipment loading that includes traffic from, for example, airplanes and heavy port equipment.

Accordingly, underground storage systems of the present invention may be constructed having walls, floors, and/or ceilings of various thicknesses, shapes and strengths (e.g., differing thicknesses of concrete or steel or differing amounts of rebar) such that they achieve a parkway load rating (e.g., a H10 load rating), an indirect traffic load rating (e.g., a H20 load rating), a direct traffic load rating (e.g., a H20 load rating), or a heavy duty equipment load rating (e.g., a H25 load rating), as required for a given installation site. Such embodiments may be employed and are possible and contemplated without departing from the scope of the present disclosure.

The above specification, examples, and data provide a complete description of the structure and use of exemplary embodiments. Feature(s) of the different embodiment(s) may be combined in yet another embodiment without departing from the recited claims.

We claim:

1. An assembly system for storing water underground, wherein the assembly system is comprised of a plurality of individual adjoining four-sided modules forming an enclosed, four-sided tessellation,
    wherein each four-sided module is comprised of a four-sided-shaped top, a combination of walls and/or legs extending downward from said four-sided-shaped top depending on their position within the assembly,
    wherein modules along a perimeter of the assembly contain one wall equal in length to the top to define the perimeter of the assembly to create an overall enclosed storage system,
    wherein, said wall is defined by extending vertically downward from said four-sided-shaped top, along its edge so that said top and walls intercept one another at their ends,
    wherein said modules along the perimeter have two legs extending vertically from the four-sided-shaped top, and positioned inward from the edges of the four-sided-shaped top, and generally positioned on the side of the four-sided-shaped top opposite of the one having a wall, said legs mirrored to one another,
    wherein modules not along the perimeter of the assembly only having two legs extending vertically from the four-sided-shaped top, and positioned inward from the edges of the four-sided-shaped top,
    wherein said legs mirrored to one another, each having a general V shape, where the intersection point of each leg face inward, toward each other, and extending inward toward each other where the sides intersect,
    wherein the resulting assembly of internal and perimeter modules is defined by having perimeter walls, and internal legs, said legs not in contact with one another within modules or between adjacent modules, spaced out away from all adjacent legs by at least one foot but not more than sixteen feet, and resulting in a system with no defined channels,
    wherein at least one said module has an access hole in its top for access into said four-sided tiling shaped assembly system after installation underground.

2. A four-sided tessellation assembly system of claim 1, wherein the modules can be stacked together to create a taller overall module,
    wherein one module, known as the top module, has a four-sided-shaped top with downward extending legs and/or walls, and second module, known as the bottom module having a four-sided-shaped bottom with upward extending legs and/or walls,
    wherein modules being stacked have identical combinations of legs and/or walls, and the top module is stacked directly over the bottom module and secured in place utilizing joints placed at the bottom edge of the side legs and/or walls of the four-sided top module and the top edge of the side walls of the four-sided bottom module, respectively.

3. A four-sided tessellation assembly system of claim 2, wherein the joint is comprised of a ball and socket joint, with one module having a ball joint and the other module having a socket joint.

4. A four-sided tessellation assembly system of claim 2, wherein the joint is a shiplap configuration.

5. A four-sided tessellation assembly system of claim 1, containing one or more inflow pipes in module tops or walls.

6. A four-sided tessellation assembly system of claim 1, containing one or more outflow pipes in module bottoms or walls.

7. A four-sided tessellation assembly system of claim 1, containing drainage holes in the bottom of said module to allow water to exit the system and percolate into underlying gravel layer or soils.

8. A four-sided tessellation assembly system of claim 1, in which up to 35% of internal four-sided shaped modules with legs are removed without reducing the overall assembly strength and resultant internal void areas are covered by a four-sided shaped top slab larger than the resultant void area of the removed module(s), said four-sided shaped top slab having a notch down on its bottom side that is smaller than the void area to lock it in place within the assembly.

9. A four-sided tessellation assembly system of claim 1, where the four-sided top module, four-sided bottom module, four-sided top slab, and side panel are all comprised of concrete reinforced with rebar.

10. A four-sided tessellation assembly system of claim 1, where the top access hole is covered with an access frame and cover and includes access risers to extend the access frame and cover to finish surface from the top access hole located underground.

11. A four-sided tessellation assembly system of claim 1, where the top access hole is covered with an access frame and cover to finish surface from the top access hole located underground.

12. A four-sided tessellation assembly system of claim 1, made water tight using an impervious liner, sealant or other means to prevent leakage.

13. A four-sided tessellation assembly system of claim 1, wherein only bottom modules along with top slabs are stacked and assembled to form a storage system.

14. A four-sided tessellation assembly system of claim 1, containing an outlet weir containing one or more weir orifices to control the flow and volume of runoff to the outlet pipe.

15. An assembly system for storing water underground, wherein the assembly system is comprised of a plurality of individual adjoining four-sided modules forming a four-sided tessellation,
    wherein each four-sided module is comprised of a four-sided-shaped top, legs extending downward from said four-sided-shaped top,
    wherein modules having two legs extending vertically from the four-sided-shaped top, and positioned inward from the edges of the four-sided-shaped top,
    wherein said legs mirrored to one another, each having a general V shape, where an intersection point of each leg face inward, toward each other and extending inward toward each other where the sides intersect,
    wherein at least one said module has an access hole in its top for access into said four-sided tiling shaped assembly system after installation underground.

16. A four-sided tessellation assembly system of claim 15, wherein vertically extending side panels are added to the external perimeter of the assembly, said side panels extending from top to bottom of the adjacent modules
    wherein the resulting assembly of internal and side panels is defined by having perimeter walls, and internal legs, said legs not in contact with one another within modules or between adjacent modules, spaced out away from all adjacent legs by at least one foot but not more than sixteen feet, and resulting in a system with no defined channels.

17. A four-sided tessellation assembly system of claim 15, wherein the modules can be stacked together to create a taller overall module,
   wherein one module, known as the top module, has a four-sided-shaped top with downward extending legs and/or walls, and second module, known as the bottom module having a four-sided-shaped bottom with upward extending legs and/or walls,
   wherein modules being stacked have identical combinations of legs and/or walls, and the top module is stacked directly over the bottom module and secured in place utilizing joints placed at the bottom edge of the side legs and/or walls of the four-sided top module and the top edge of the side walls of the four-sided bottom module, respectively.

18. A four-sided tessellation assembly system of claim 15, containing one or more inflow pipes in module tops or walls.

19. A four-sided tessellation assembly system of claim 15, containing one or more outflow pipes in module bottoms or walls.

20. A four-sided tessellation assembly system of claim 15, containing drainage holes in the bottom of said module to allow water to exit the system and percolate into underlying gravel layer or soils.

21. A four-sided tessellation assembly system of claim 15, in which up to 35% of internal four-sided shaped modules with legs are removed without reducing the overall assembly strength and resultant internal void areas are covered by a four-sided shaped top slab larger than the resultant void area of the removed module(s), said four-sided shaped top slab having a notch down on its bottom side that is smaller than the void area to lock it in place within the assembly.

22. A four-sided tessellation assembly system of claim 15, where the four-sided top module, four-sided bottom module, four-sided top slab, and side panel are all comprised of concrete reinforced with rebar.

23. A four-sided tessellation assembly system of claim 15, where the top access hole is covered with an access frame and cover and includes access risers to extend the access frame and cover to finish surface from the top access hole located underground.

24. A four-sided tessellation assembly system of claim 15, where the top access hole is covered with an access frame and cover to finish surface from the top access hole located underground.

25. A four-sided tessellation assembly system of claim 15, made water tight using an impervious liner, sealant or other means to prevent leakage.

26. A four-sided tessellation assembly system of claim 15, wherein only bottom modules along with top slabs are stacked and assembled to form a storage system.

27. A four-sided tessellation assembly system of claim 15, wherein the joint is a ball and socket joint, with one module having a ball joint and the other module having a socket joint.

28. A four-sided tessellation assembly system of claim 15, wherein the joint is a shiplap configuration.

29. A four-sided tessellation assembly system of claim 15, containing an outlet weir containing one or more weir orifices to control the flow and volume of runoff to the outlet pipe.

30. An assembly system for storing water underground, wherein the assembly system is comprised of a plurality of individual adjoining modules forming a tessellation,
   wherein each module is comprised of a top, a combination of walls and/or legs extending downward from said top depending on their position within the assembly,
   wherein modules along the perimeter of the assembly contain one wall equal in length to the top to define the perimeter of the assembly to create an overall enclosed storage system,
   wherein, said wall is defined by extending vertically downward from said top, along its edge so that said top and walls intercept one another at their ends,
   wherein said modules along the perimeter have one or more legs extending vertically from the top, and positioned inward from the edges of the top, and generally positioned on the side of the top opposite of the one having a wall, said one or more legs extending inward to the center of the top,
   wherein modules not along the perimeter of the assembly only having one or more legs extending vertically from the top, and positioned inward from the edges of the top,
   wherein said one or more legs having a general V shape,
   wherein the resulting assembly of internal and perimeter modules is defined by having perimeter walls, and internal legs, said legs not in contact with one another within modules or between adjacent modules,
   wherein said modules of assembly are arranged as a tiling,
   wherein at least one said module has an access hole in its top for access into said tiling shaped assembly system after installation underground.

31. A tessellation assembly system of claim 30, wherein the modules can be stacked together to create a taller overall module,
   wherein one module, known as the top module, has a top with downward extending legs and/or walls, and second module, known as the bottom module having a bottom with upward extending legs and/or walls,
   wherein modules being stacked have identical combinations of legs and/or walls, and the top module is stacked directly over the bottom module and secured in place utilizing joints placed at the bottom edge of the side legs and/or walls of the module and the top edge of the side walls of the bottom module, respectively.

32. A tessellation assembly system of claim 31, wherein the joint is comprised of a ball and socket joint, with one module having a ball joint and the other module having a socket joint.

33. A tessellation assembly system of claim 31, wherein the joint is a shiplap configuration.

34. A tessellation assembly system of claim 30, containing one or more inflow pipes in module tops or walls.

35. A tessellation assembly system of claim 30, containing one or more outflow pipes in module bottoms or walls.

36. A tessellation assembly system of claim 30, containing drainage holes in the bottom of said module to allow water to exit the system and percolate into underlying gravel layer or soils.

37. A tessellation assembly system of claim 30, in which up to 50% of internal modules with legs are removed without reducing the overall assembly strength and resultant internal void areas are covered by a top slab larger than the resultant void area of the removed module(s), said top slab having a notch down on its bottom side that is smaller than the void area to lock it in place within the assembly.

38. A tessellation assembly system of claim 30, where the top module, bottom module, top slab, and side panel are all comprised of concrete reinforced with rebar.

39. A tessellation assembly system of claim 30, where the top access hole is covered with an access frame and cover and includes access risers to extend the access frame and cover to finish surface from the top access hole located underground.

40. A tessellation assembly system of claim 30, where the top access hole is covered with an access frame and cover to finish surface from the top access hole located underground.

41. A tessellation assembly system of claim 30, made water tight using an impervious liner, sealant or other means to prevent leakage.

42. A tessellation assembly system of claim 30, wherein only bottom modules along with top slabs are stacked and assembled to form a storage system.

43. A tessellation assembly system of claim 30, containing an outlet weir containing one or more weir orifices to control the flow and volume of runoff to the outlet pipe.

* * * * *